(12) United States Patent
Jang et al.

(10) Patent No.: US 12,267,900 B2
(45) Date of Patent: *Apr. 1, 2025

(54) SIGNALING FOR MULTI-LINK TRANSMISSION

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Suhwook Kim, Seoul (KR); Namyeong Kim, Seoul (KR); Sungjin Park, Seoul (KR); Taewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

This patent is subject to a terminal disclaimer.

(21) Appl. No.: 17/791,867

(22) PCT Filed: Jan. 8, 2021

(86) PCT No.: PCT/KR2021/000273
§ 371 (c)(1),
(2) Date: Jul. 8, 2022

(87) PCT Pub. No.: WO2021/141449
PCT Pub. Date: Jul. 15, 2021

(65) Prior Publication Data
US 2023/0164859 A1 May 25, 2023

(30) Foreign Application Priority Data

Jan. 8, 2020 (KR) .................. 10-2020-0002495
Jan. 9, 2020 (KR) .................. 10-2020-0003396

(Continued)

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC ..... H04W 76/15; H04W 84/12; H04W 76/11; H04L 69/14
See application file for complete search history.

(56) References Cited

U.S. PATENT DOCUMENTS

| 2016/0226626 A1 | 8/2016 | Dayanandan et al. |
| 2017/0366251 A1 | 12/2017 | Ravishankar et al. |

(Continued)

FOREIGN PATENT DOCUMENTS

| CN | 101589594 | 11/2009 |
| CN | 102265547 | 11/2011 |

(Continued)

OTHER PUBLICATIONS

European Patent Office Application Serial No. 21738512.9, Search Report dated Jan. 5, 2023, 9 pages.

(Continued)

*Primary Examiner* — Will W Lin
(74) *Attorney, Agent, or Firm* — LEE, HONG, DEGERMAN, KANG & WAIMEY

(57) ABSTRACT

In a wireless local area network system, a multi-link device (MLD) may transmit a multi-link element including a number-of-links field and a link present field indicating whether the number-of-links field exists. The multi-link element further includes a multi-link control field, a common information field, and a link information field. The number-of-links field may be included in the multi-link control field.

14 Claims, 49 Drawing Sheets

(30) Foreign Application Priority Data

| | | |
|---|---|---|
| Mar. 5, 2020 | (KR) | 10-2020-0027999 |
| Mar. 12, 2020 | (KR) | 10-2020-0030981 |
| Dec. 18, 2020 | (KR) | 10-2020-0178831 |

(56) References Cited

U.S. PATENT DOCUMENTS

| | | | |
|---|---|---|---|
| 2018/0205502 A1 | 7/2018 | Merlin et al. | |
| 2018/0288743 A1* | 10/2018 | Choi | H04L 27/2602 |
| 2019/0082373 A1 | 3/2019 | Patil et al. | |
| 2019/0268956 A1 | 8/2019 | Xiao et al. | |
| 2019/0335454 A1 | 10/2019 | Huang et al. | |
| 2021/0014911 A1* | 1/2021 | Patil | H04W 12/73 |
| 2021/0058868 A1 | 2/2021 | Cariou et al. | |
| 2021/0400662 A1* | 12/2021 | Huang | H04W 72/542 |
| 2022/0303997 A1* | 9/2022 | Aio | H04W 52/243 |
| 2022/0408506 A1* | 12/2022 | Kim | H04W 28/20 |
| 2023/0007572 A1 | 1/2023 | Patil et al. | |
| 2023/0011167 A1* | 1/2023 | Chitrakar | H04W 76/15 |

FOREIGN PATENT DOCUMENTS

| | | |
|---|---|---|
| CN | 109588059 | 4/2019 |
| CN | 110035564 | 7/2019 |
| CN | 110199494 | 9/2019 |
| IN | 201947023141 | 7/2019 |
| WO | 2008010007 | 1/2008 |
| WO | 2009154352 | 12/2009 |
| WO | 2012075630 | 6/2012 |
| WO | 2019139789 | 7/2019 |

OTHER PUBLICATIONS

Korean Intellectual Property Office Application No. 10-2022-7023269, Office Action dated Apr. 29, 2024, 10 pages.

Min et al., "Multi-link power save operation," IEEE 802.11-19/1544r0, Sep. 2019, 16 pages.

Chu et al., "Multiple Band Operation Discussion," IEEE 802.11-19/0821r5, May 2019, 10 pages.

Yunbo Li, et al., "Multi-link Association", doc.: IEEE 802.11-19/1549r1, Dec. 2019, 12 pages.

Po-Kai Huang et al., "Multi-link Broadcast Addressed frame Reception", doc.: IEEE 802.11-19/1542r1, Nov. 2019, 10 pages.

Insun Jang, el al., "Discussion on Multi-link Setup", doc.: IEEE 802.11-19/1509r5, Nov. 2019, 15 pages.

PCT International Application No. PCT/KR2021/000273, International Search Report dated Apr. 15, 2021, 4 pages.

U.S. Appl. No. 18/216,234, Office Action dated Dec. 12, 2023, 6 pages.

State Intellectual Property Office of the People's Republic of China Application Serial No. 202180013558.1, Office Action dated Jul. 19, 2024, 10 pages.

Watteyne et al., "Efficient 6LoWPAN Neighbor Discovery Applied to Multilink IoT Subnets", IEEE ICC 2015 SAC—Internet of Things, 6 pages.

Huang, "WLAN", Journal of Computer Applications, vol. 29, No. 2, Feb. 2009, 4 pages.

The State Intellectual Property Office of the People's Republic of China Application Serial No. 202180013558.1, Notice of Allowance dated Nov. 13, 2024, 5 pages.

European Patent Office Application Serial No. 24202410.7, Search Report dated Nov. 15, 2024, 13 pages.

3rd Generation Partnership Project; Technical Specification Group Core Network; Packet Domain; Mobile Station (MS) supporting Packet Switched Services (3G TS 27.060 version 3.3.0 Release 1999), 3G TS 27.060 V3.3.0, Jan. 2000, 49 pages.

TSG CN WG3, "CRs on Rel5 Work Item CS Data", 3GPP TSG CN Plenary Meeting #18, NP-020617, Dec. 2022, 119 pages.

802.11 Working Group of the LAN/MAN Standards Committee of the IEEE Computer Society; IEEE P802.11BeTM/ DO.1, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), Sep. 2020, pp. 1-126.

802.11 Working Group of the LAN/MAN Standards Committee of the IEEE Computier Society; IEEE P802.11BeTM/ DO.1, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), Sep. 2020, pp. 127-200.

802.11 Working Group of the LAN/MAN Standards Committee of the IEEE Computier Society; IEEE P802.11BeTM/ DO.1, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), Sep. 2020, pp. 201-299.

* cited by examiner (a)

| L-LTF | L-STF | L-SIG | Data |

PPDU Format (IEEE 802.11a/g)

| L-LTF | L-STF | L-SIG | SIG A | HT-SFT | HT-LFT | ... | HT-LFT | Data |

HT PPDU Format (IEEE 802.11n)

| L-LTF | L-STF | L-SIG | VHT-SIG A | VHT-SFT | VHT-LFT | VHT-SIG B | Data |

VHT PPDU Format (IEEE 802.11ac)

| 8μs | 8μs | 4μs | 4μs | 8μs | 4μs per symbol | 4μs | Variable durations per HE-LTF symbol | | |
|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

FIG. 39

Order →

NR Element (Legacy)
NR Element (Legacy)
NR Element (ML, Link 2)
NR Element (ML, Link 3)

| Number of links | ML indication from NR element | Simultaneous TX/RX | Operating links | Primary links | ... |
|---|---|---|---|---|---|
| | 0011 | | | | |

Indiction regarding ML operation (covering Simultaneous TX/RX, Operating links, Primary links, ...)

FIG. 47

| | MLD ID | Link ID | Change Sequence | ... |
|---|---|---|---|---|
| AP 1 | MLD ID (=0) | Link ID (=0) | Change Sequence | ... |
| AP 2 | MLD ID (=0) | Link ID (=1) | Change Sequence | ... |
| AP 3 | MLD ID (=0) | Link ID (=2) | Change Sequence | ... |
| Another AP #1 | MLD ID (=3) | Link ID (=1) | Change Sequence | ... |
| Another AP #2 | MLD ID (=3) | Link ID (=0) | Change Sequence | ... |

SIGNALING FOR MULTI-LINK TRANSMISSION

CROSS-REFERENCE TO RELATED APPLICATIONS

This application is the National Stage filing under 35 U.S.C. 371 of International Application No. PCT/KR2021/000273, filed on Jan. 8, 2021, which claims the benefit of earlier filing date and right of priority to Korean Application Nos. 10-2020-0002495, filed on Jan. 8, 2020, 10-2020-0003396, filed Jan. 9, 2020, 10-2020-0027999, filed Mar. 5, 2020, 10-2020-0030981, filed Mar. 12, 2020, and 10-2020-0178831, filed Dec. 18, 2020, the contents of which are all incorporated by reference herein in their entireties.

BACKGROUND

Technical Field

The present specification relates to a signaling method for a multi-link operation in a wireless local area network (WLAN) system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Solutions

A method performed by a transmitting device in a wireless local area network (WLAN) system according to various embodiments of the present disclosure may include technical features related to a link setup method for a multi-link operation. A transmitting multi-link device (MLD) of a wireless local area network (WLAN) system may generate a multi-link element. The multi-link element may include a multi-link control field and a common info field. The multi-link control field may include a first present field related to presence/absence of a number of links field. The common information field may include the number of links field based on the first present field. The transmitting MLD may transmit the multi-link element.

TECHNICAL EFFECTS

According to an example of the present specification, it is possible to enable multi-link setup and multi-link operation by transmitting multi-link information including information related to other links. In addition, it is possible to achieve a technical effect of reducing signaling overhead through the present field indicating whether multi-link information is included in the multi-link element.

BRIEF DESCRIPTION OF THE DRAWINGS

FIG. 4 illustrates an example of a PPDU used in an IEEE standard.

FIG. 39 is a diagram illustrating an embodiment of an NR element.

FIG. 46 and FIG. 47 are diagrams illustrating a process of establishing a multi-link setup with an MLD to which an AP that has performed discovery belongs and an embodiment of a reduced neighbor report (RNR).

DETAILED DESCRIPTION

Figure 1:
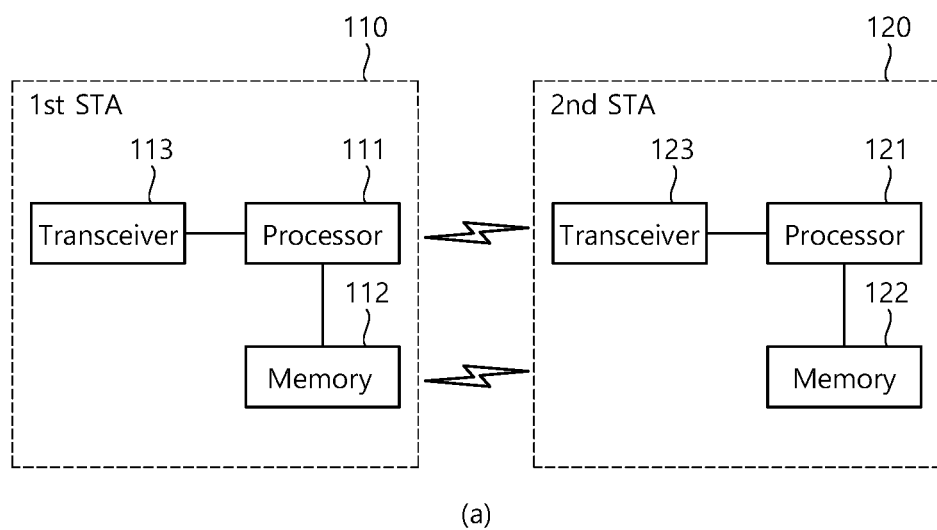
FIG. 1 shows an example of a transmitting apparatus and/or receiving apparatus of the present specification.
Figure 1:
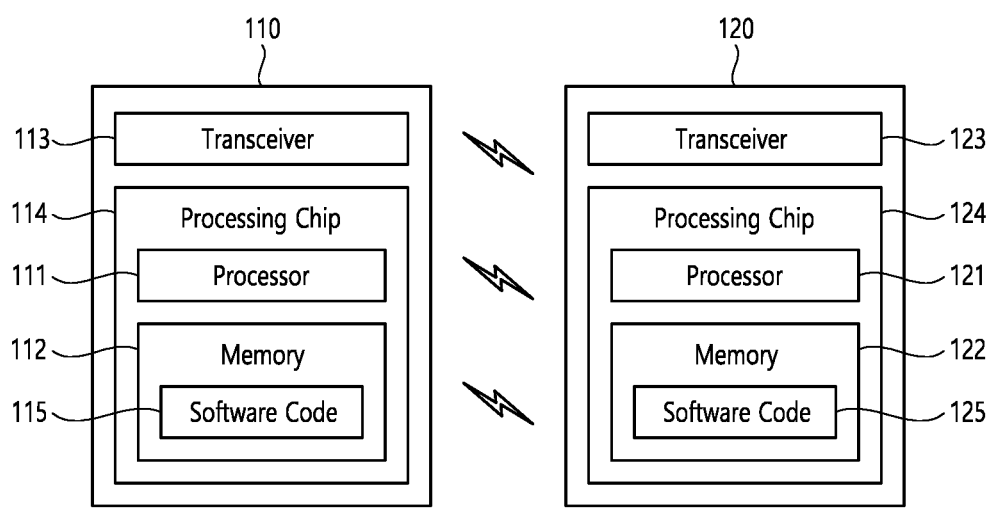

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11 a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
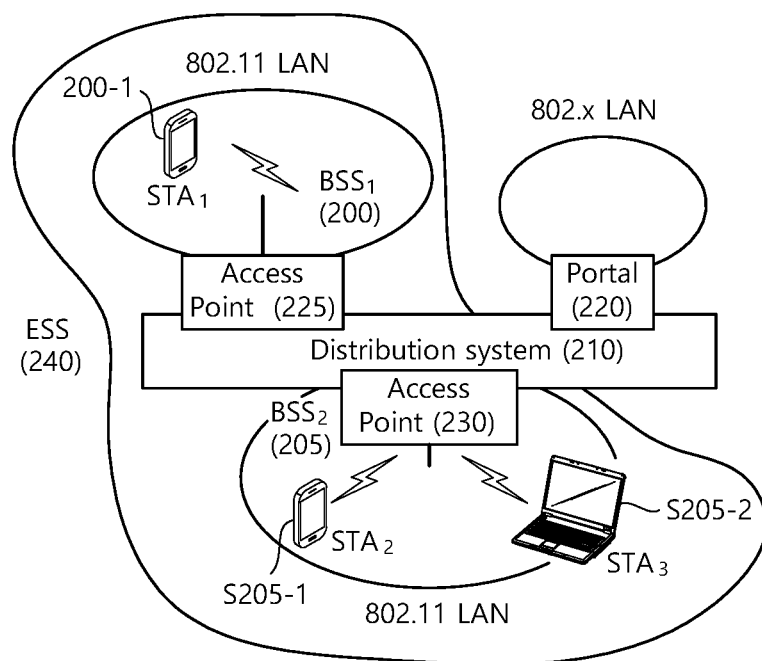
FIG. 2 is a conceptual view illustrating the structure of a wireless local area network (WLAN).
Figure 2:
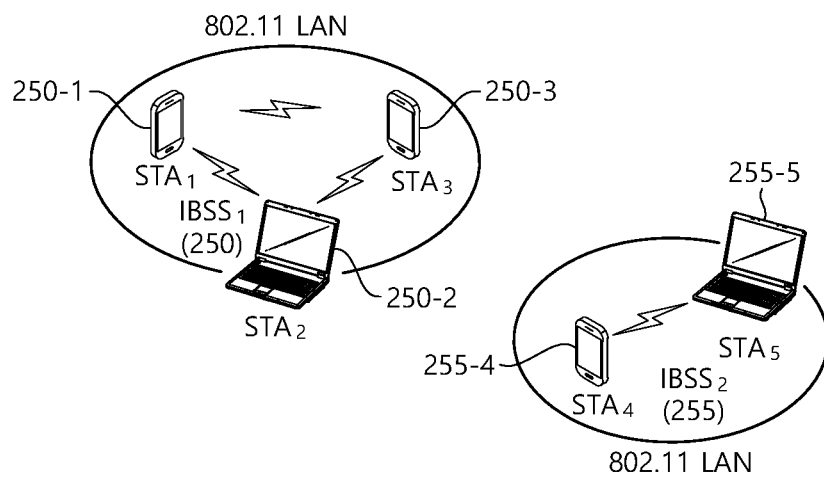

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
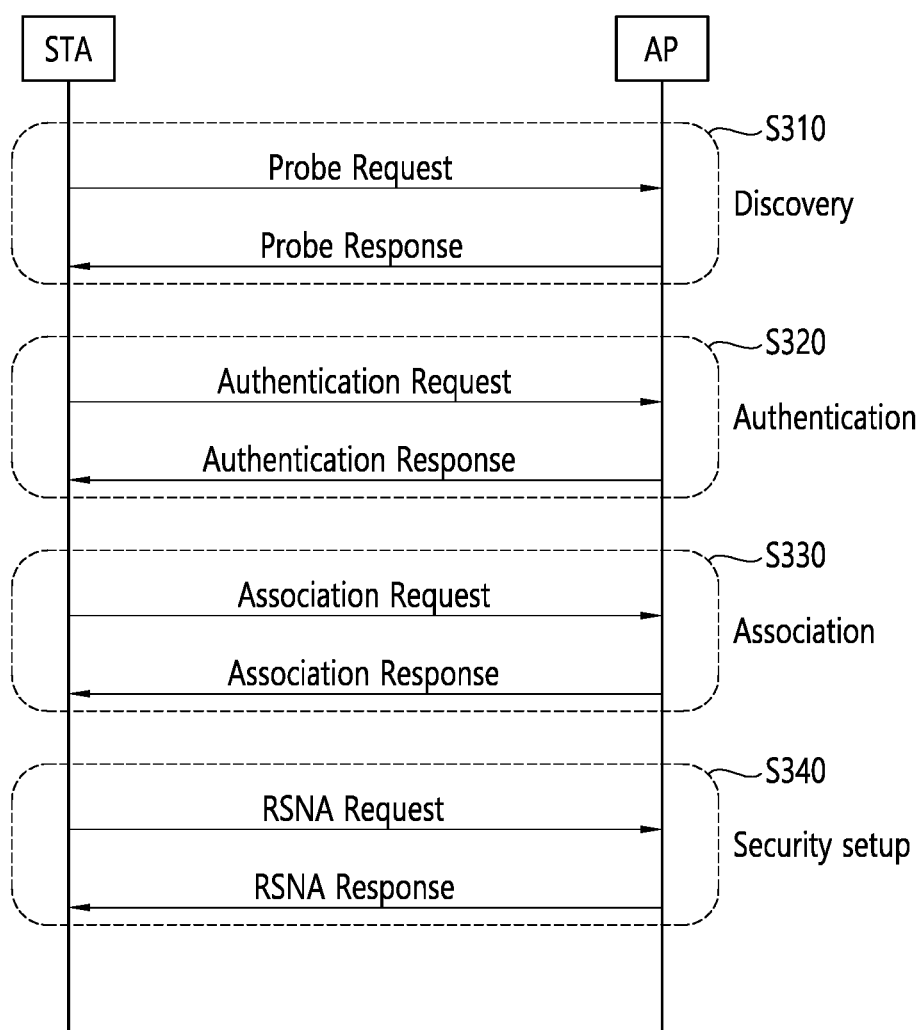
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
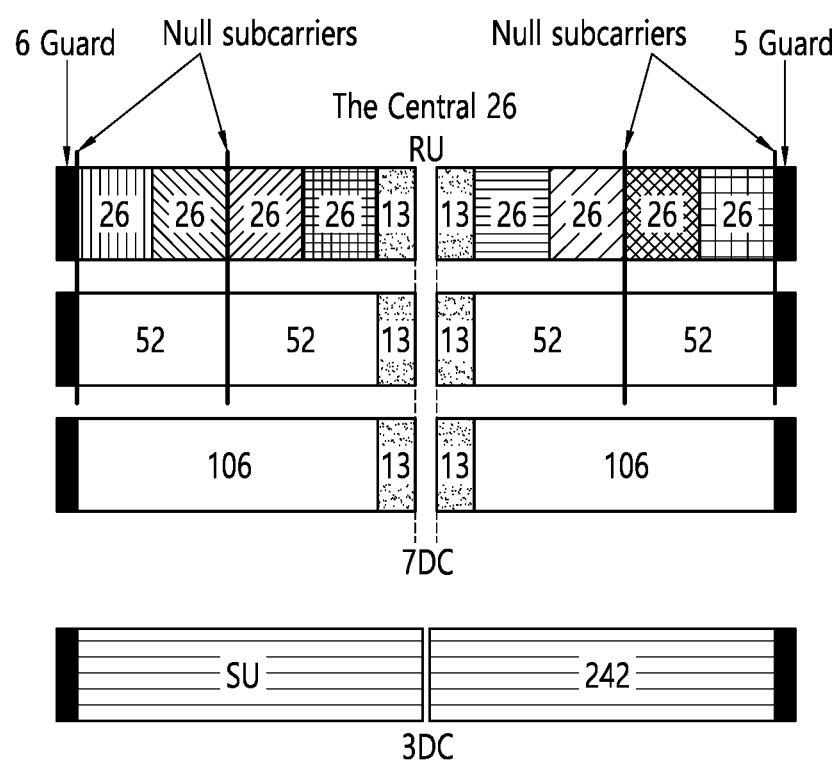
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
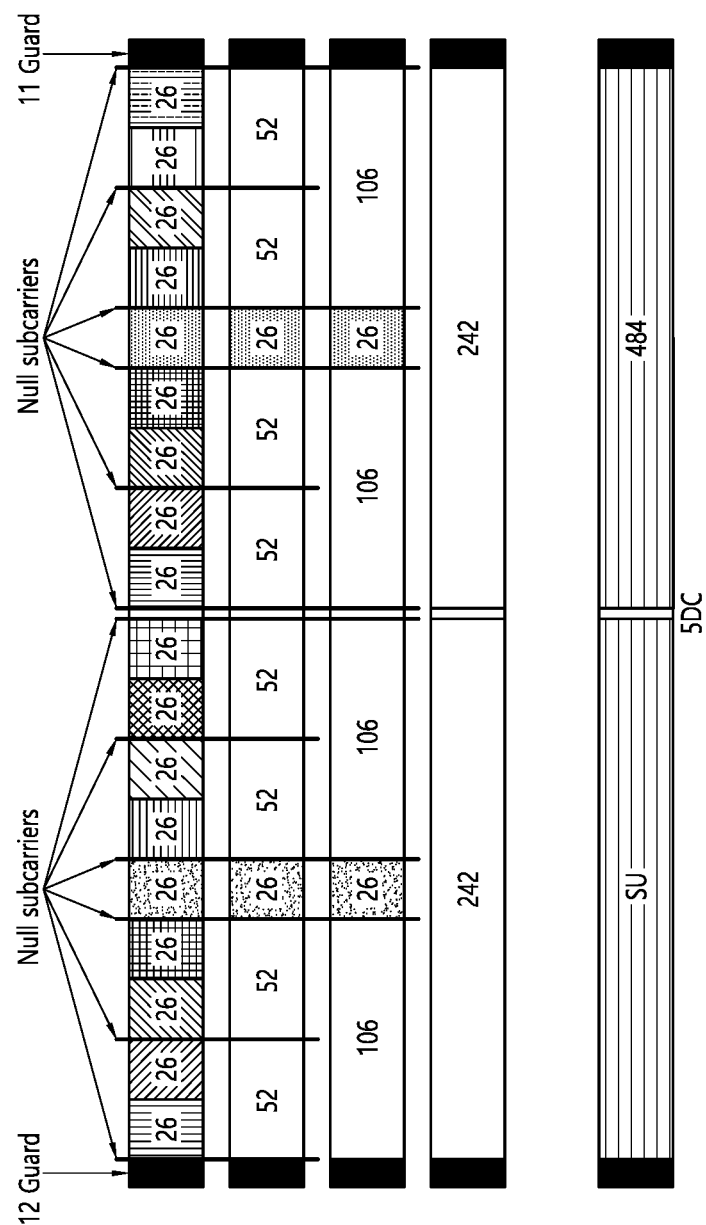
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40

MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
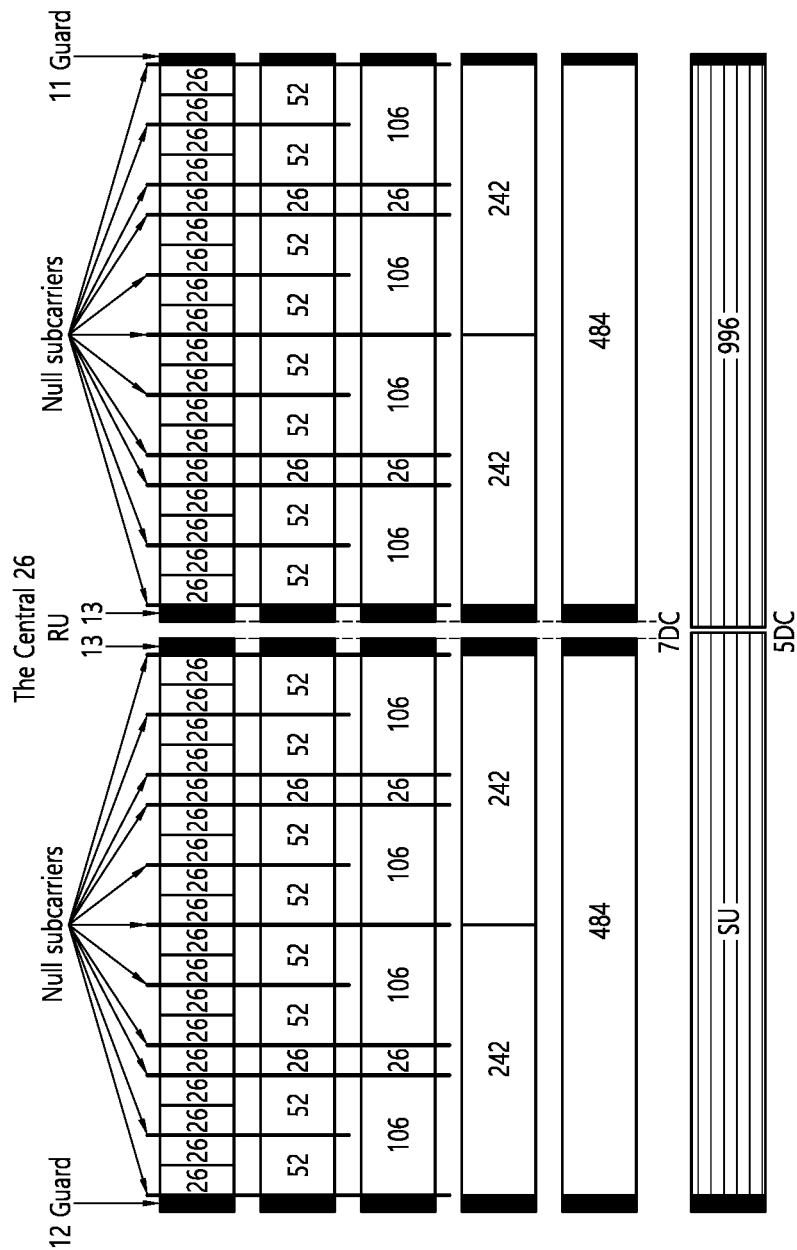
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
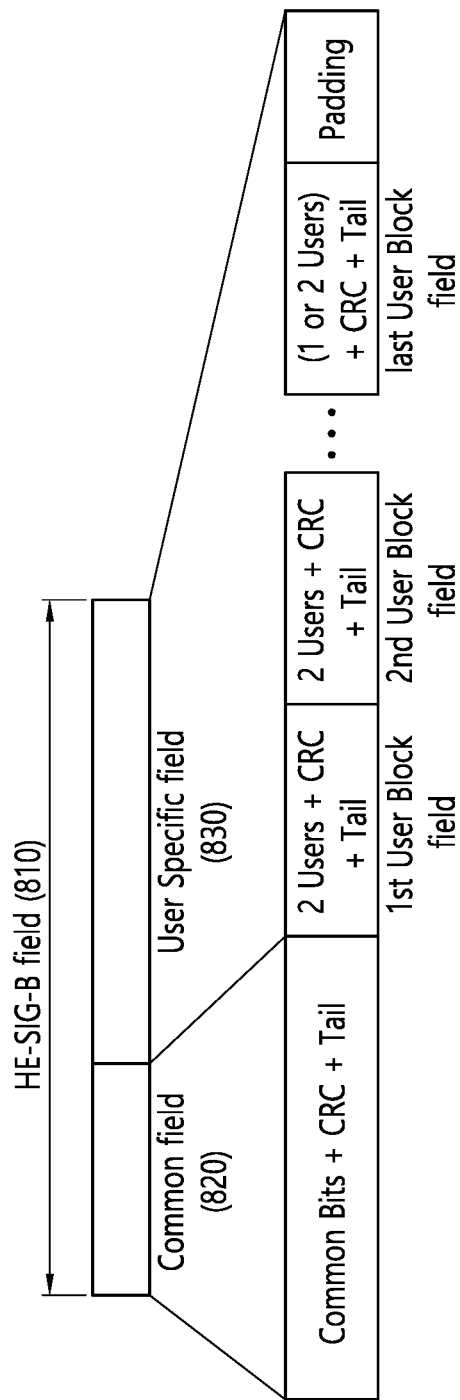
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
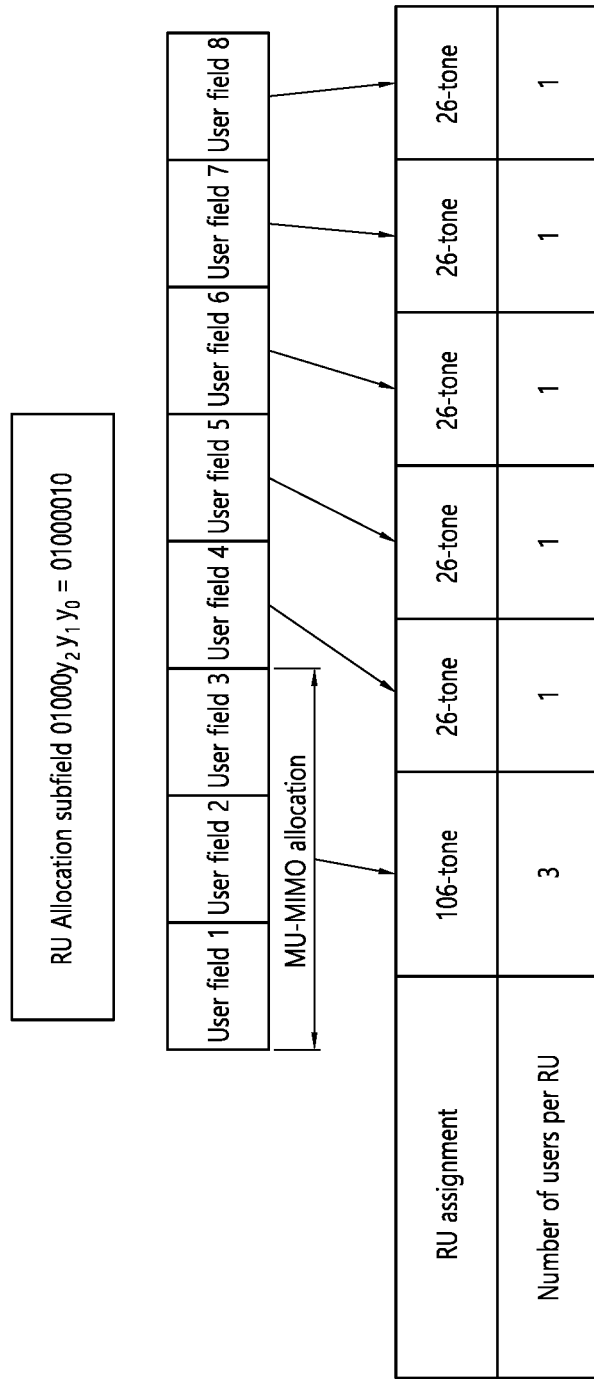
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 |  |
|   | 0111-1000 | 3-4 | 3 | | | | | | | 6-7 |  |
|   | 1001 | 4 | 4 | | | | | | | 8 |  |
| 3 | 0000-0011 | 1-4 | 1 | 1 | | | | | | 3-6 | 13 |
|   | 0100-0110 | 2-4 | 2 | 1 | | | | | | 5-7 |  |
|   | 0111-1000 | 3-4 | 3 | 1 | | | | | | 7-8 |  |
|   | 1001-1011 | 2-4 | 2 | 2 | | | | | | 6-8 |  |
|   | 1100 | 3 | 3 | 2 | | | | | | 8 |  |
| 4 | 0000-0011 | 1-4 | 1 | 1 | 1 | | | | | 4-7 | 11 |
|   | 0100-0110 | 2-4 | 2 | 1 | 1 | | | | | 6-8 |  |
|   | 0111 | 3 | 3 | 1 | 1 | | | | | 8 |  |
|   | 1000-1001 | 2-3 | 2 | 2 | 1 | | | | | 7-8 |  |
|   | 1010 | 2 | 2 | 2 | 2 | | | | | 8 |  |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 |  |
|   | 0110 | 2 | 2 | 2 | 1 | 1 | | | | 8 |  |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 |  |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
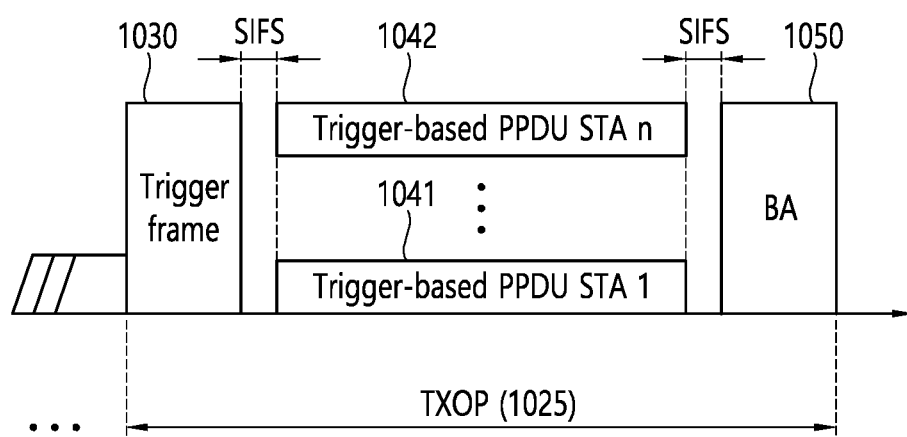
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
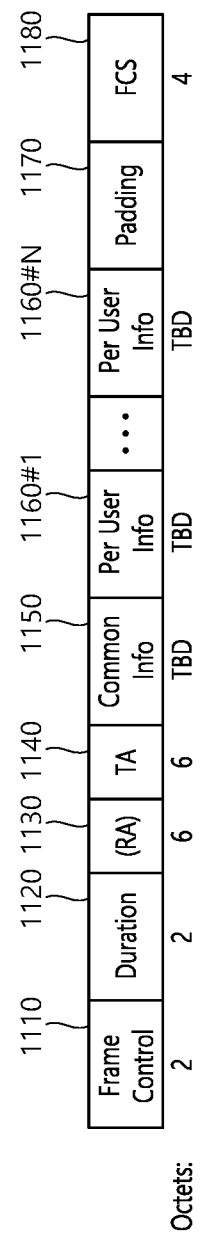
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
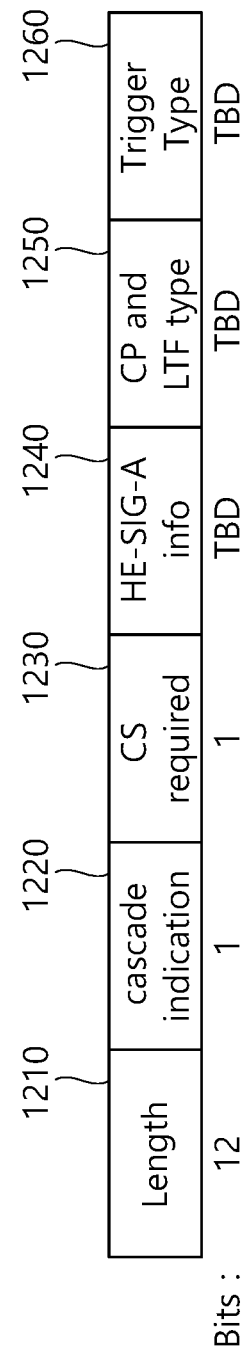
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
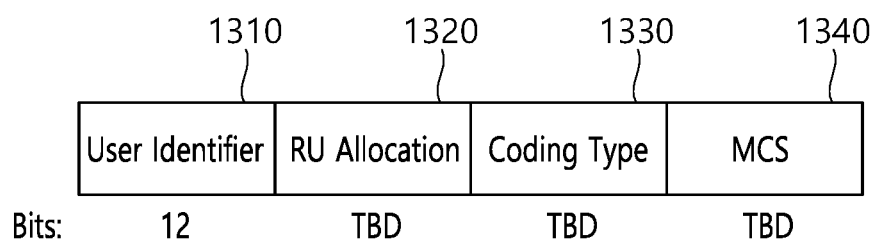
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
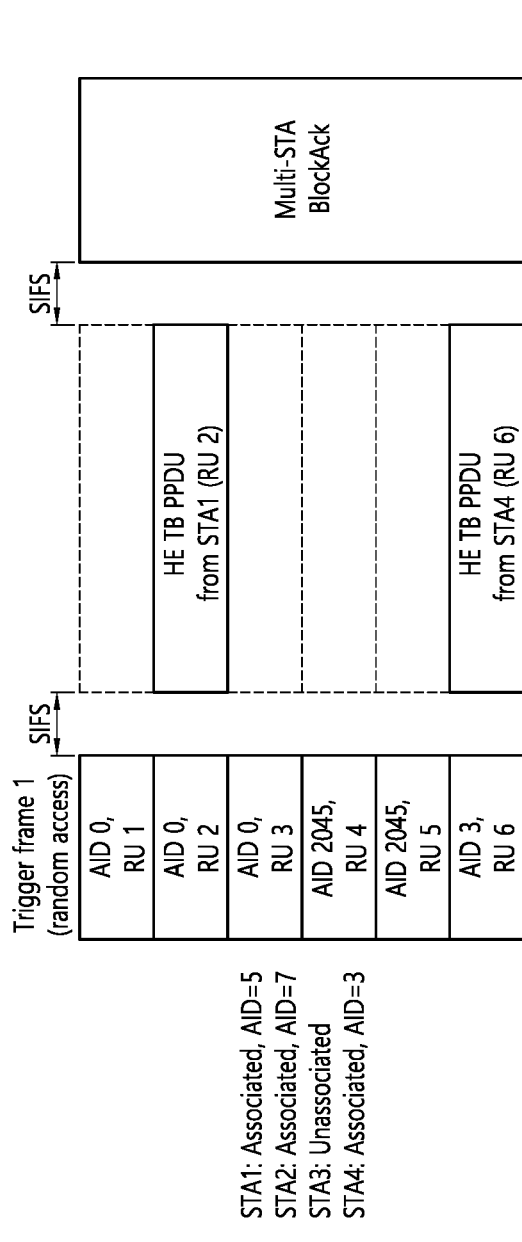
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
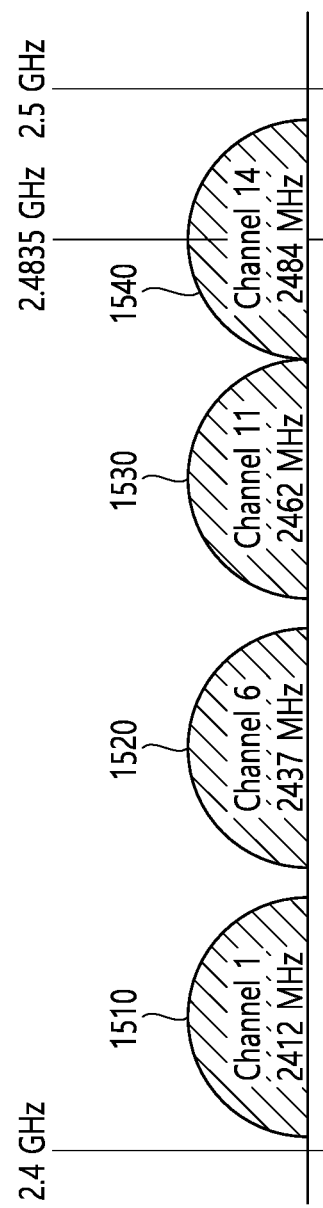
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
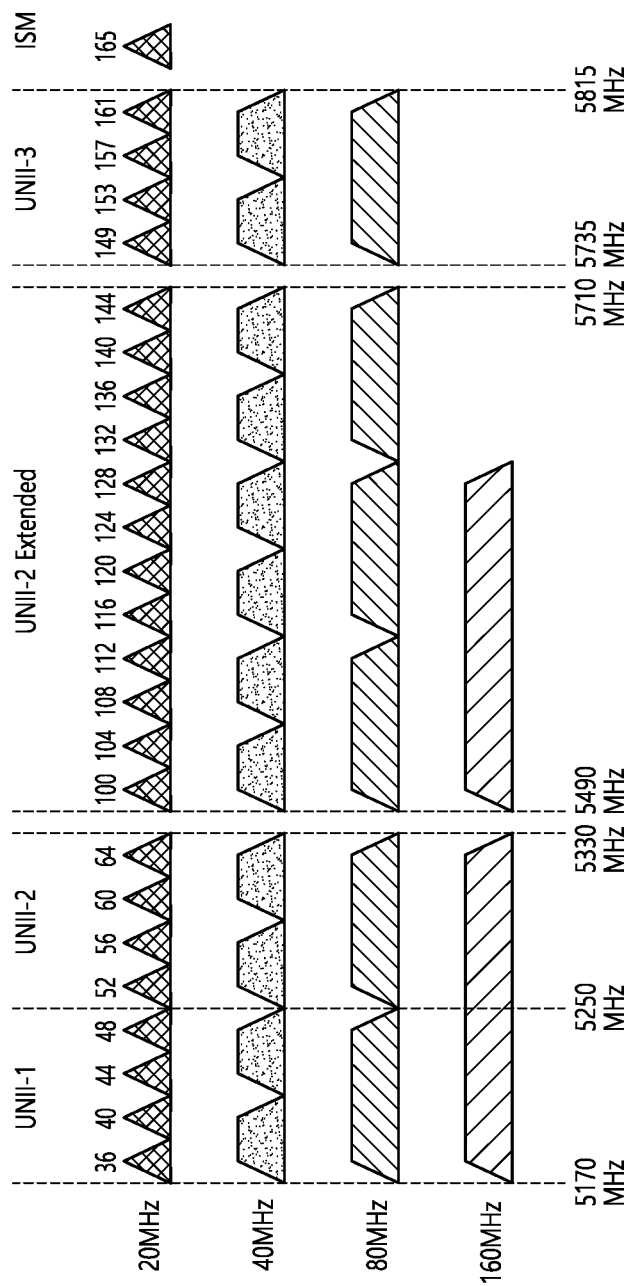
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
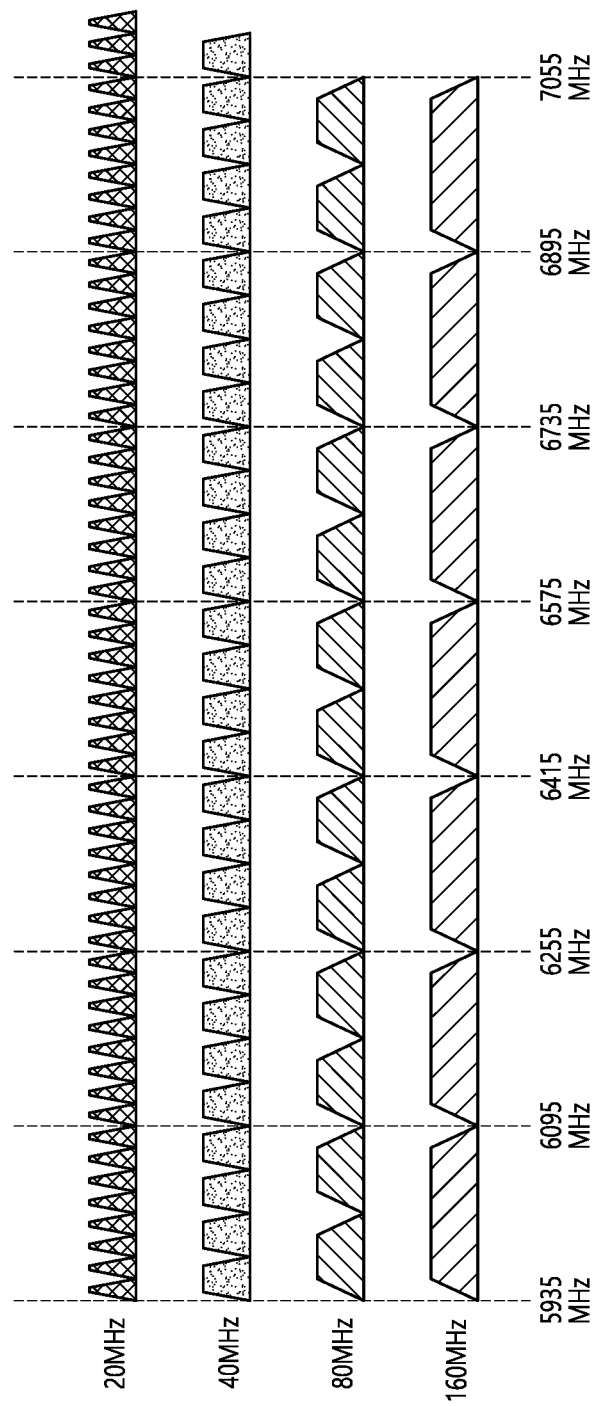
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
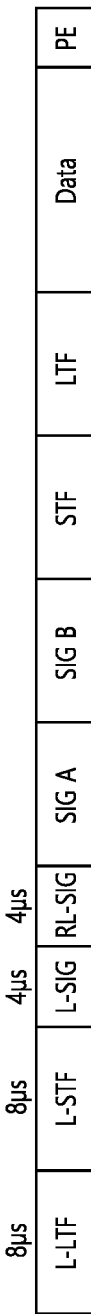
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 |  | 1 |
| 2 | 26 | 26 | 26 | 26 | 26 | 52 |  | 26 | 26 | 1 |
| 3 | 26 | 26 | 26 | 26 | 26 | 52 |  | 52 |  | 1 |
| 4 | 26 | 26 | 52 |  | 26 | 26 | 26 | 26 | 26 | 1 |
| 5 | 26 | 26 | 52 |  | 26 | 26 | 26 | 52 |  | 1 |
| 6 | 26 | 26 | 52 |  | 26 | 52 |  | 26 | 26 | 1 |
| 7 | 26 | 26 | 52 |  | 26 | 52 |  | 52 |  | 1 |
| 8 | 52 |  | 26 | 26 | 26 | 26 | 26 | 26 | 26 | 1 |
| 9 | 52 |  | 26 | 26 | 26 | 26 | 26 | 52 |  | 1 |
| 10 | 52 |  | 26 | 26 | 26 | 52 |  | 26 | 26 | 1 |
| 11 | 52 |  | 26 | 26 | 26 | 52 |  | 52 |  | 1 |
| 12 | 52 |  | 52 |  | 26 | 26 | 26 | 26 | 26 | 1 |
| 13 | 52 |  | 52 |  | 26 | 26 | 26 | 52 |  | 1 |
| 14 | 52 |  | 52 |  | 26 | 52 |  | 26 | 26 | 1 |
| 15 | 52 |  | 52 |  | 26 | 52 |  | 52 |  | 1 |
| 16 | 26 | 26 | 26 | 26 | 26 | 106 |  |  |  | 1 |
| 17 | 26 | 26 |  | 52 |  | 26 | 106 |  |  | 1 |
| 18 | 52 |  | 26 | 26 | 26 | 106 |  |  |  | 1 |
| 19 | 52 |  | 52 |  | 26 | 106 |  |  |  | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |  | 106 |  |  | 26 | 26 | 26 | 26 | 26 | 1 |
| 21 |  | 106 |  |  | 26 | 26 | 26 | 52 |  | 1 |
| 22 |  | 106 |  |  | 26 | 52 |  | 26 | 26 | 1 |
| 23 |  | 106 |  |  | 26 | 52 |  | 52 |  | 1 |
| 24 | 52 |  | 52 |  | — |  | 52 |  | 52 | 1 |
| 25 | 242-tone RU empty (with zero users) | | | | | | | | | 1 |
| 26 |  | 106 |  |  | 26 |  | 106 |  |  | 1 |
| 27-34 |  |  |  |  | 242 |  |  |  |  | 8 |
| 35-42 |  |  |  |  | 484 |  |  |  |  | 8 |
| 43-50 |  |  |  |  | 996 |  |  |  |  | 8 |
| 51-58 |  |  |  |  | 2*996 |  |  |  |  | 8 |
| 59 | 26 | 26 | 26 | 26 | 26 |  | 52 + 26 |  | 26 | 1 |
| 60 | 26 |  | 26 + 52 |  | 26 | 26 | 26 | 26 | 26 | 1 |
| 61 | 26 |  | 26 + 52 |  | 26 | 26 | 26 | 52 |  | 1 |
| 62 | 26 |  | 26 + 52 |  | 26 | 52 |  | 26 | 26 | 1 |
| 63 | 26 | 26 |  | 52 |  | 26 | 52 + 26 |  | 26 | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 64 | 26 |  | 26 + 52 |  | 26 |  | 52 + 26 |  | 26 | 1 |
| 65 | 26 |  | 26 + 52 |  | 26 |  | 52 |  | 52 | 1 |

TABLE 7

| 66 | 52 |  | 26 | 26 | 26 |  | 52 + 26 |  | 26 | 1 |
|---|---|---|---|---|---|---|---|---|---|---|
| 67 | 52 |  | 52 |  | 26 |  | 52 + 26 |  | 26 | 1 |
| 68 | 52 |  | 52 + 26 |  |  |  | 52 |  | 52 | 1 |
| 69 | 26 | 26 | 26 | 26 |  |  | 26 + 106 |  |  | 1 |
| 70 | 26 |  | 26 + 52 |  | 26 |  | 106 |  |  | 1 |
| 71 | 26 | 26 | 52 |  |  |  | 26 + 106 |  |  | 1 |
| 72 | 26 |  | 26 + 52 |  |  |  | 26 + 106 |  |  | 1 |
| 73 |  | 52 | 26 | 26 |  |  | 26 + 106 |  |  | 1 |
| 74 |  | 52 | 52 |  |  |  | 26 + 106 |  |  | 1 |
| 75 |  |  | 106 + 26 |  |  | 26 | 26 | 26 | 26 | 1 |
| 76 |  |  | 106 + 26 |  |  | 26 | 26 |  | 52 | 1 |
| 77 |  |  | 106 + 26 |  |  | 52 |  | 26 | 26 | 1 |
| 78 |  |  | 106 |  | 26 |  | 52 + 26 |  | 26 | 1 |
| 79 |  |  | 106 + 26 |  |  |  | 52 + 26 |  | 26 | 1 |
| 80 |  |  | 106 + 26 |  |  |  | 52 |  | 52 | 1 |
| 81 |  |  | 106 + 26 |  |  |  | 106 |  |  | 1 |
| 82 |  |  | 106 |  |  |  | 26 + 106 |  |  | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 pts, and a periodicity signal of 0.8 pts may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 pts, and a periodicity signal of 1.6 pts may be repeated 5 times to become a second type STF having a length of 8 µs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad <\text{Equation 1}>$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112)=\{M\}*(1+j)/\text{sqrt}(2)$$

$$\text{EHT-STF}(0)=0 \quad <\text{Equation 2}>$$

The EHT-STF for the 40 MHz PPDU may be configured based on the following equation. The following example may be the first type (i.e., 1×STF) sequence.

$$\text{EHT-STF}(-240:16:240)=\{M,0,-M\}*(1+j)/\text{sqrt}(2) \quad <\text{Equation 3}>$$

The EHT-STF for the 80 MHz PPDU may be configured based on the following equation. The following example may be the first type (i.e., 1×STF) sequence.

$$\text{EHT-STF}(-496:16:496)=\{M,1,-M,0,-M,1,-M\}*(1+j)/\text{sqrt}(2) \quad <\text{Equation 4}>$$

The EHT-STF for the 160 MHz PPDU may be configured based on the following equation. The following example may be the first type (i.e., 1×STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \quad <\text{Equation 5}>$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496)=\{-M,-1,M,0,-M,1,-M\}*(1+j)/\text{sqrt}(2) \quad <\text{Equation 6}>$$

Equation 7 to Equation 11 below relate to an example of a second type (i.e., 2×STF) sequence.

$$\text{EHT-STF}(-120:8:120)=\{M,0,-M\}*(1+j)/\text{sqrt}(2) \quad <\text{Equation 7}>$$

The EHT-STF for the 40 MHz PPDU may be configured based on the following equation.

$$\text{EHT-STF}(-248{:}8{:}248) = \{M,-1,-M,0,M,-1,M\}*(1+j)/\text{sqrt}(2)$$

$$\text{EHT-STF}(-248) = 0$$

$$\text{EHT-STF}(248) = 0 \qquad \text{<Equation 8>}$$

The EHT-STF for the 80 MHz PPDU may be configured based on the following equation.

$$\text{EHT-STF}(-504{:}8{:}504) = \{M,-1,M,-1,-M,-1,M,0,-M,1,M,1,-M,1,-M\}*(1+j)/\text{sqrt}(2) \qquad \text{<Equation 9>}$$

The EHT-STF for the 160 MHz PPDU may be configured based on the following equation.

$$\text{EHT-STF}(-1016{:}16{:}1016) = \{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$\text{EHT-STF}(-8) = 0, \text{EHT-STF}(8) = 0,$$

$$\text{EHT-STF}(-1016) = 0, \text{EHT-STF}(1016) = 0 \qquad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504{:}8{:}504) = \{-M,1,-M,1,M,1,-M,0,-M,1,M,1,-M,1,-M\}*(1+j)/\text{sqrt}(2)$$

$$\text{EHT-STF}(-504) = 0,$$

$$\text{EHT-STF}(504) = 0 \qquad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1.6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
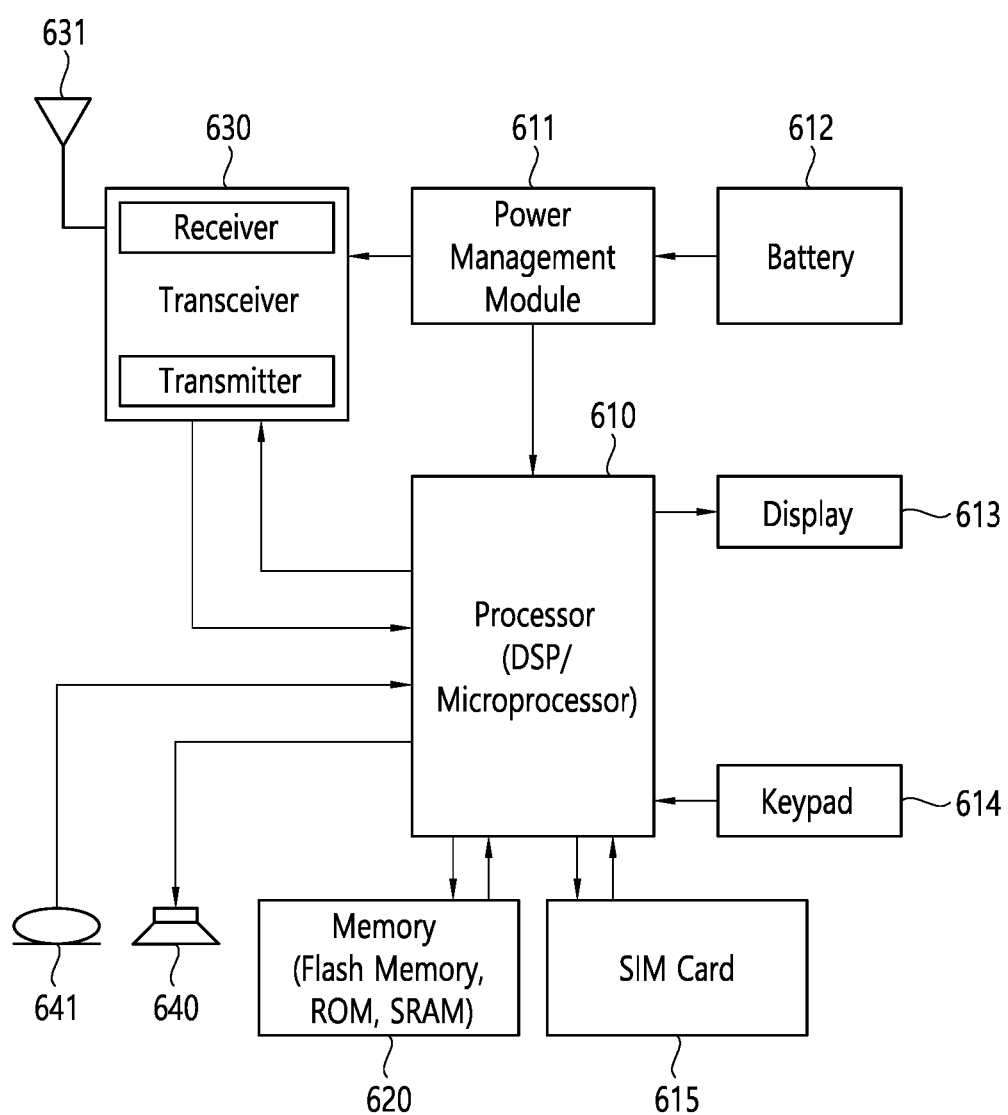
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
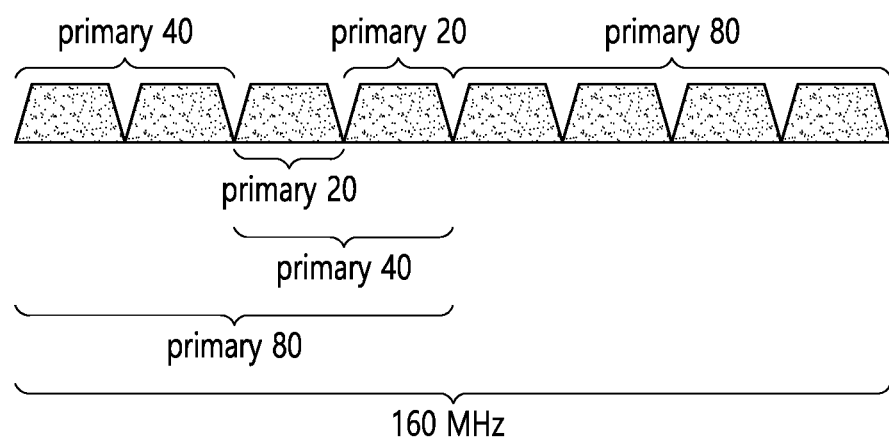
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

In extreme high throughput (EHT), a standard being discussed after IEEE802.11ax, the introduction of HARQ is being considered. When HARQ is introduced, coverage can be expanded in a low signal to noise ratio (SNR) environment, that is, in an environment where the distance between the transmitting terminal and the receiving terminal is long, and higher throughput may be obtained in a high SNR environment.

The device described below may be the apparatus of FIGS. 1 and/or 19, and the PPDU described below may be the PPDU of FIG. 18. The device may be an AP or a non-AP STA. The device described below may be an AP multi-link device (MLD) supporting multi-link or a non-AP STA MLD.

Figure 21:
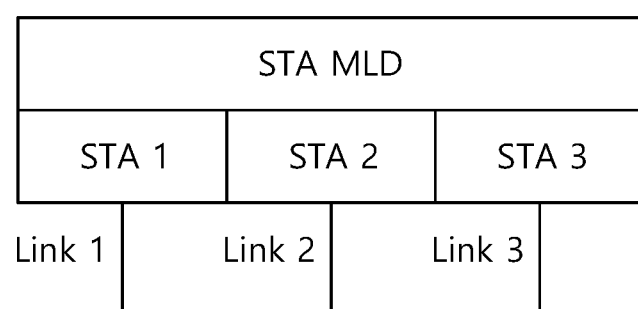
FIG. 21 is a diagram illustrating an embodiment of a device supporting the multi-link.

In extremely high throughput (EHT), a standard being discussed after 802.11ax, a multi-link environment using one or more bands at the same time is being considered. When the device supports multi-link or multi-link, the device may use one or more bands (e.g., 2.4 GHz, 5 GHz, 6 GHz, 60 GHz, etc.) simultaneously or alternately. Multi-link transmission can be classified into two types as shown in FIG. 21.

Hereinafter, although described in the form of a multi-link, the frequency band may be configured in various other forms. Although terms such as multi-band and/or multi-link may be used in this specification, the following embodiments may be described based on multi-link for convenience of description below.

In the following specification, MLD refers to a multi-link device. The MLD has one or more affiliated STAs and has one MAC service access point (SAP) that connects to an upper link layer (Logical Link Control, LLC). The MLD may mean a physical device or a logical device. Hereinafter, a device may mean the MLD.

In the following specification, a transmitting device and a receiving device may refer to the MLD. The first link of the receiving/transmitting device may be a terminal (e.g., STA or AP) that performs signal transmission/reception through the first link included in the receiving/transmitting device. The second link of the receiving/transmitting device may be a terminal (e.g., STA or AP) that performs signal transmission/reception through the second link included in the receiving/transmitting device.

IEEE802.11be can support two types of multi-link operations. For example, simultaneous transmit and receive (STR) and non-STR operations may be considered. For example, an STR may be referred to as an asynchronous multi-link operation, and a non-STR may be referred to as a synchronous multi-link operation. The multi-link may include a multi-band. That is, the multi-link may mean a link included in several frequency bands, or may mean a plurality of links included in one frequency band.

The EHT (11be) considers multi-link technology, where the multi-link may include the multi-band. That is, the multi-link may represent links of several bands and may also represent several multi-links within one band. Two types of multi-link operation may be considered. Asynchronous operation that enables simultaneous TX/RX on multiple links and synchronous operation that does not enable the simultaneous TX/RX are considered. Hereinafter, the capability that enables the simultaneous reception and transmission in multiple links may be referred to as STR (simultaneous transmit and receive), a STA with the STR capability may be referred to as an STR multi-link device (MLD), and a STA that does not have the STR capability may be referred to as non-STR MLD.

FIG. 21 is a diagram illustrating an embodiment of a device supporting the multi-link.

Referring to FIG. 21, the STA MLD (or AP MLD) may include three STAs, may have three links, and each link may have a primary channel (PCH). In 11be, the STA MLD should provide information related to one or more links it has for single setup. Therefore, a method for indicating the above-information may be required. Hereinafter, a method for this and a method for using the same will be described.

The terminology (name) in the present disclosure may be changed, and the STA may include an AP STA or a non-AP STA.

Figure 22:
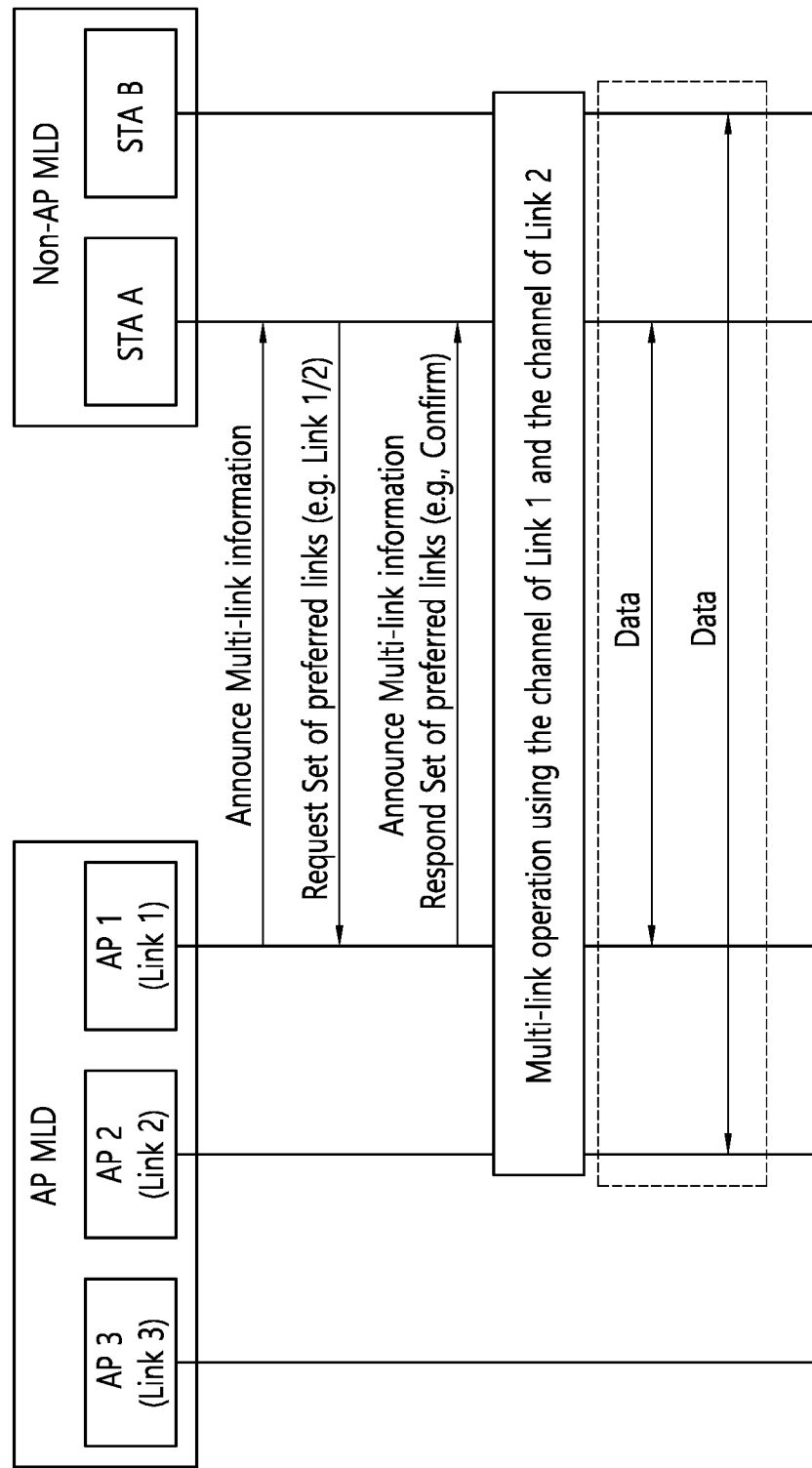
FIG. 22 is a diagram illustrating an embodiment of a multi-link setup process.

FIG. 22 is a diagram illustrating an embodiment of a multi-link setup process.

Referring to FIG. 22, the AP MLD may provide multi-link information to the non-AP MLD. Based on the multi-link information, the non-AP MLD may request the link 1 and the link 2 as operating link(s) through the link 1, and the AP MLD responds to the request.

In the present disclosure, a link that transmits the multi-link information, such as the link 1, may be referred to as an association link, and other link(s) may be referred to as a non-association link.

A method of indicating the multi-link information transmitted through the link 1 may be as follows.

Information related to an association link such as the link 1 may be transmitted through an EHT capability/operation element similarly to the conventional one. For example, since an EHT STA or MLD having a single-link currently operates only on one link, a procedure similar to the conventional procedure may be applied to the association link, which is the only link.

Non-association links such as the link 2 and the link 3 can be indicated using a new element. That is, the new element that can indicate information related to link(s) other than the association link can be defined. In the present disclosure, this element may be referred to as a multi-link element, and is not limited thereto and may be changed.

The multi-link element may indicate information related to one or more links except for the link through which the multi-link element is transmitted. However, the link through which the multi-link element is transmitted may not necessarily be excluded, and information related to the corresponding link may be included as necessary. Information that can be included in the multi-link element may be as follows, but is not limited thereto. In addition, according to various cases, all of the following contents may be included, or only some of them may be included according to the frame type/operation. The following name may be changed.

1) Number of supported links: This indicates the total number of supported links.

Ex) When using a Bitmap and the total number of links is set to '3', the above content can be set to '11' if association link is included and '10' if not included.

The number of supported links may mean the number of APs that can simultaneously exchange data frames (and/or management frames) by the AP MLD, and the number of non-AP STAs that can simultaneously exchange data frames by the non-AP MLD. The technical effect obtained by indicating this value in the multi-link (ML) element will be separately described in the Present field below.

2) Link Specific information: This information includes specific information related to each Link, and this information may be as follows but is not limited thereto.

2-1) Link identifier: An identifier that can distinguish each link. The AP/STA may newly define an identifier for each link, or may use an existing BSSID, BSS Color, or the like as a link ID.

Ex) New identifier: 0, 1, 2, etc.

2-2) Channel information: This information includes channel information for each Link, and this information may be as follows but is not limited thereto.

Band Information: This information includes information related to a band supporting the multi-link operation. Specifically, this information includes an ID capable of distinguishing a band in which EHT operates, a Band ID field of a conventional specification, etc., but is not limited thereto.

Ex 1) Band ID: 0-2.4 GHz, 1-5 GHz, 2-6 GHz, etc.

Ex 2) Band ID field: 2-2.4 GHz, 4-5 GHz, 7-6 GHz, etc.

Primary channel: This information includes a primary channel number of the corresponding link channel.

Channel Width: This information includes a channel bandwidth of the corresponding link channel.

CCFS 0: Center Frequency of Primary80

CCFS 1: Channel Center Frequency Segment of Secondary 80 or Primary 160

In order to support 240 MHz/320 MHz, the CCFS 2 may be additionally required.

CCFS 2: In case of 240 MHz, Channel Center Frequency of S80-2 or P240 (P320 or S160 in case of 320 MHz)

2-3) Assisted information: This information includes information that can help the STA MLD select a link, transition, or operate BSS load information: This information includes the BSS load information of the link and the BSS load element field of the existing specification.

TSF/Beacon interval: This information includes a timestamp/Beacon interval of the link channel TID mapping: This information includes a TID assigned to the link Ex) The '00001111' may indicate TID 4 to TID 7 are mapped to the link in case when a bitmap for TID 0 to TID 7 is used.

Primary link: This indicates whether the corresponding link is a primary link. Here, the primary link refers to a link on which main BSS functionality is performed for the purpose of channel access and power saving.

Link Status: This includes information related to whether each link is currently available for data transmission (On/Off)

Ex) When indicated by link-specific information, it is set to '0' and the STA cannot use the link for current data transmission. It is set to '1' and thee STA can use the link for current data transmission Ex) When not indicated by information for each link, it may be expressed in bitmap form: In case of '011', the bitmap denotes that the first link has a capability but is not currently used for data transmission.

2-4) Capability: It includes capability related information of each link

Supported number of Spatial Stream (NSS): It includes the number of Spatial Streams supported by each link.

Ex) 1/2/4/8/16

Supported Band Information (SBI): It includes band information capable of multi-link operation. Specifically, this can be an ID capable of distinguishing a band in which EHT operates, a Band ID field of an existing Spec, etc., but is not limited thereto.

Ex 1) Band ID: '0' for 2.4 GHz, '1' for 5 GHz, '2' for 6 GHz, etc.

Ex 2) Band ID field: '2' for 2.4 GHz, '4' for 5 GHz, '7' for 6 GHz, etc.

Ex 3) Bitmap: It can be a multiple selection of 2.4/5/6 GHz. For example, '011' may denote that a 5 GHz band and a 6 GHz band are supported.

3) Indication regarding multi-link operation: It indicates for multiple multi-link operation.

Simultaneous TX/RX (STR): It indicates the capability that enables simultaneous TX/RX in multiple links, that is, whether RX is possible in another link while TX in one link Ex 1) If the Element indicates in the Link indication order, whether all link pairs are STRs, such as [link1, link2], [link 1, link 3], can be indicated in the form of a bitmap.

For a case where N links are present, 1 bit for each pair is used to indicate whether it is STR. Each bit indicates whether a pair of [$1^{st}$, 2nd] is STR, . . . , a pair of [$1^{st}$, Nth] is STR, a pair of [$2^{nd}$, 3st] is STR. If it is STR, a corresponding value is set to '0'. If not, a corresponding value is set to '1'.

Ex 2) If the Element indicates based on the Link indication order, whether STR is possible for pairs, i.e., [link 1, link 2], [link 2, link 3], in sequence can be indicated in the form of a bitmap. In this way, the relationship between the link 1 and the link 3 can be known from the [link 1, link 2] and the [link 2, link 3]. For example, if the [link 1, link 2] is STR and the [link 2, link 3] is STR, the link 1 and the link 3 will be STR.

For N links, whether each pair is STR in sequence can be indicated with 1 bit. The STR of 1st link and 2nd link, STR of 2nd link and 3rd link, . . . /'1' if STR, '0' otherwise.

It can reduce overhead than Ex 1), but the link indication should be in order.

Operating link: Indication for the link to operate

Ex 1) If the elements indicate in the link indication order, the operating link can be indicated in the form of a bitmap.

If an association link and the first non-association link are selected from three links, '110' may be indicated. Further, if the association link is not included, '10' may be indicated. For example, when link specific information is included, only information related to actual operating links may be included, and in this case, the operating link field may not present.

Similar to the example where the '10' is indicated, if the association (discovered) link is always considered as an operating link, the association link related bit may be excluded. That is, in a total of three links, only two links may be indicated by a bitmap.

Primary link: This indicates whether the corresponding link is a primary link. Here, the primary link refers to a link on which main BSS functionality is performed for the purpose of channel access and power saving.

Ex 1) If the elements indicate in the link indication order, the operating link can be indicated in the form of a bitmap. In three links, if the association link is a primary link, it may be indicated as '100' if indicating including an association link, and may be indicated as '10' if indicated without including an association link.

Similar to the example where the '10' is indicated, if the association (discovered) link is always considered as a primary link, the association link related bit may be excluded. That is, in a total of three links, only two links may be indicated by a bitmap.

TID-to-link mapping: This indicates which TID is mapped to the link

Ex 1) For TID 0 to TID 7, 8 bits are indicated in a bitmap in the order of each link indication.

Ex 2) This is indicated by a bitmap as many as the number of links for one TID.

Ex 3) TIDs can be grouped to indicate, for example, TIDs mapped to the same AC (e.g., TID 1,2) can be indicated with 1 bit. That is, mapping may be performed per AC, and two ACs may be indicated by 1 bit in order to further reduce signaling overhead. That is, there is a trade-off between signaling overhead and granularity.

Figure 23:
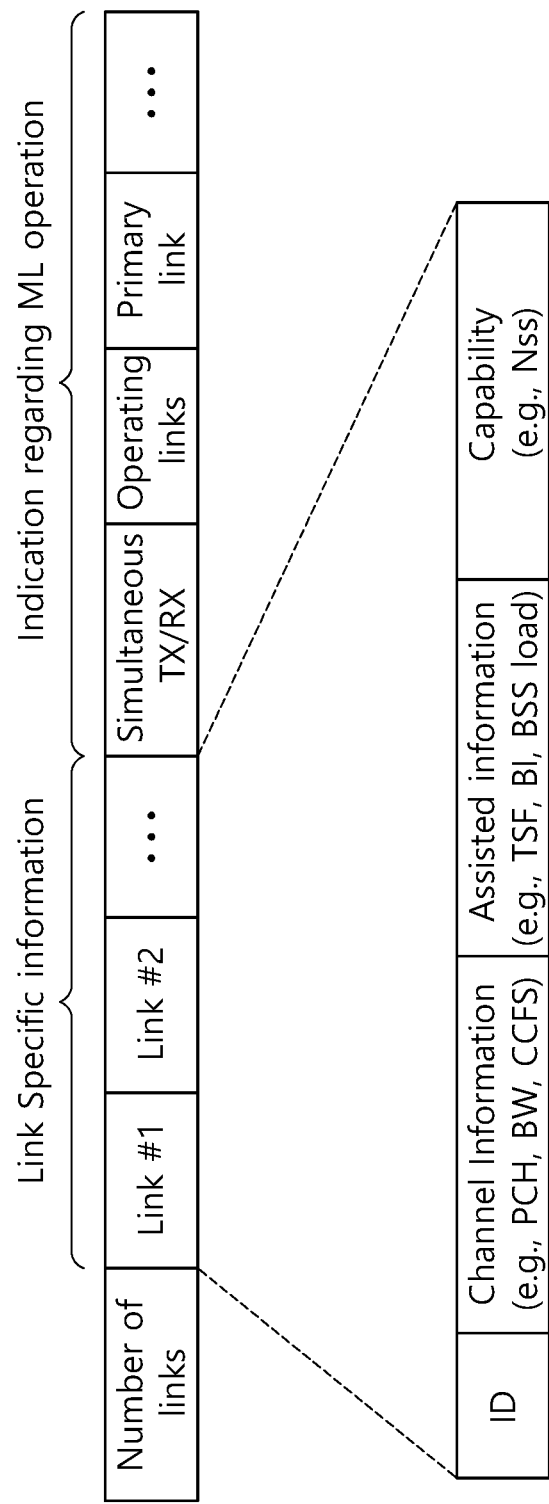
FIG. 23 is a diagram illustrating an embodiment of a multi-link element.

FIG. 23 is a diagram illustrating an embodiment of a multi-link element.

Referring to FIG. 23, the multi-link element may include a number of links field, a Link Specific information field, and an Indication regarding ML operation field. The Link Specific information field may include ID, Channel Information, Assisted information, and Capability fields.

The multi-link element may be applied to the following examples.

Example 1: An Example for Indicating a Link Set

The multi-link element can be used when requesting/responding an operation link and determining the primary link described above.

It can be indicated in the form of a bitmap by using the order of the indicated links.

Figure 24:
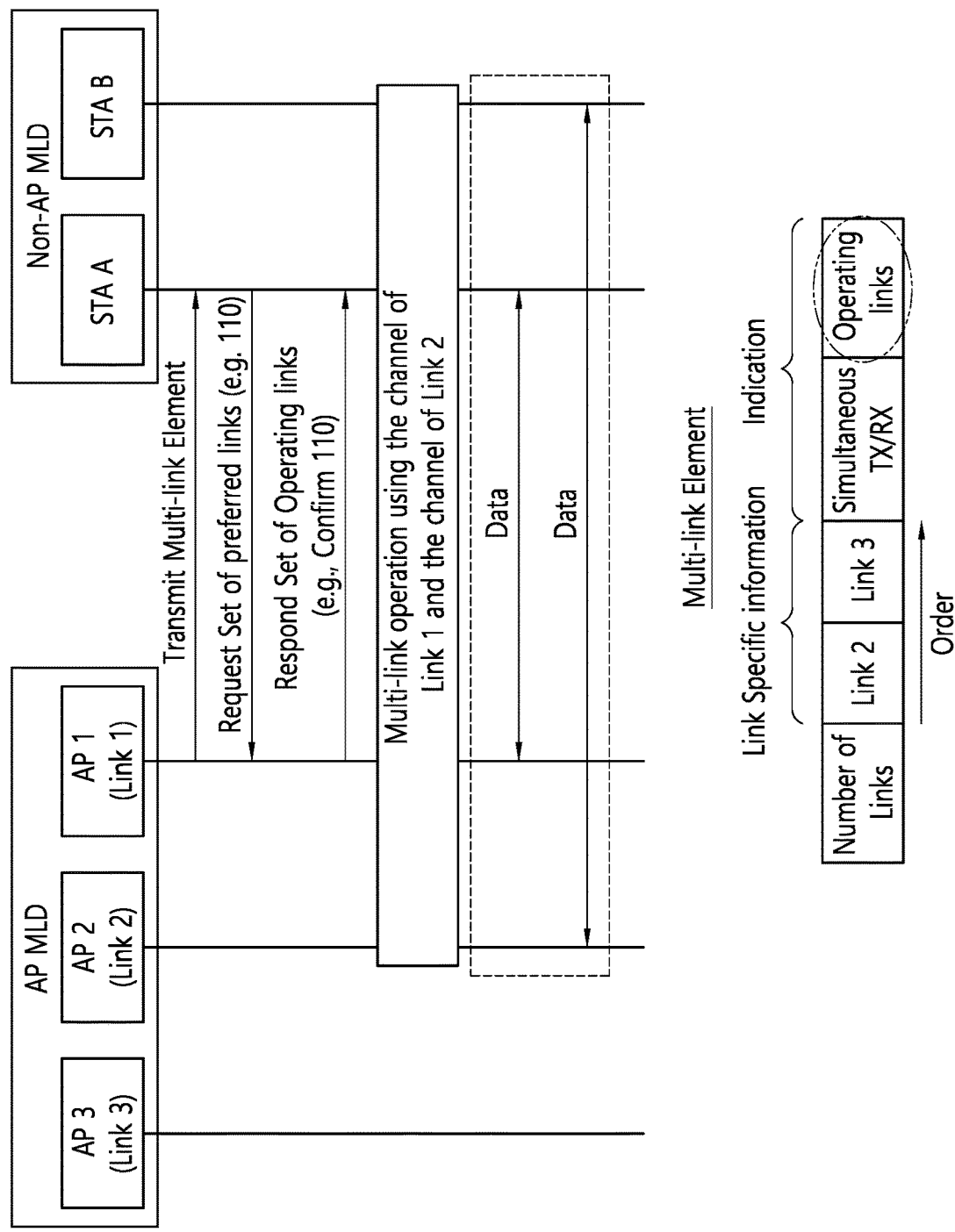
FIG. 24 is a diagram illustrating an embodiment of a method of indicating an operating link set.

FIG. 24 is a diagram illustrating an embodiment of a method of indicating an operating link set.

Referring to FIG. 24, the multi-link element includes information related to the link 2 and the link 3 in order, a STA A requests the link 1 and the link 2 as an operating link, and an AP 1 responds to the request. In this case, the link set can be indicated by using a bitmap in the order of the link 1 (transmitting the element), the link 2, and the link 3. Therefore, the STA A may request the AP by indicating the bitmap of '110', and the AP may confirm the bitmap of '110'.

Figure 25:
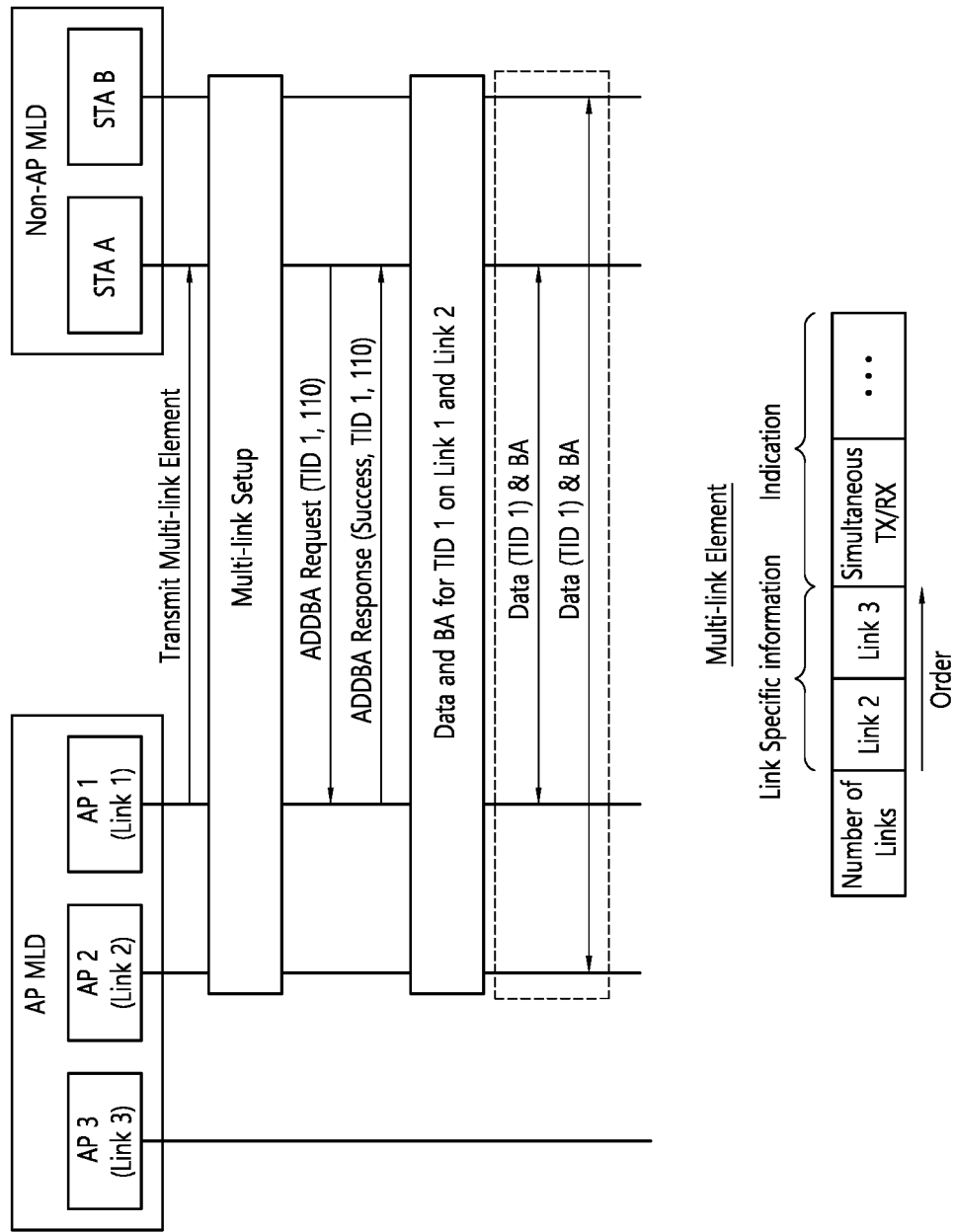
FIG. 25 is a diagram illustrating an embodiment of a method for indicating a link set in a Single BA Agreement.

FIG. 25 is a diagram illustrating an embodiment of a method for indicating a link set in a Single BA Agreement.

Referring to FIG. 25, the multi-link element includes information related to the link 2 and the link 3 in order, and a STA A is negotiating with an AP to use a BA for the TID 1 in the link 1 and the link 2. In this case, the link set can be indicated by using a bitmap in the order of the link 1 (transmitting the element), the link 2, and the link 3. Accordingly, the STA A may indicate '110' (i.e., indicate the link 1 and the link 2) to request the AP using an ADDBA frame, and the AP may confirm the success (with bitmap '110') as it is.

Example 2: An Example of Indicating STR Capability

Figure 26:
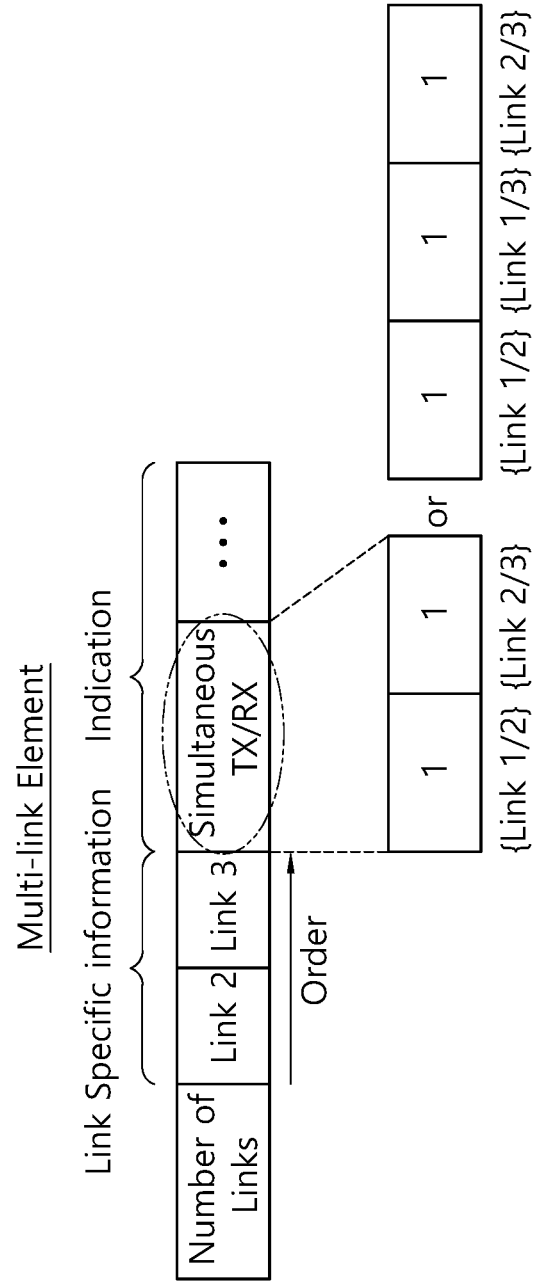
FIG. 26 is a diagram illustrating an embodiment of a method of indicating STR capability.

FIG. 26 is a diagram illustrating an embodiment of a method of indicating STR capability.

Referring to FIG. 26, the Multi-link Element includes information on the link 2 and the; ink 3 in order, and may indicate STR capability for link(s) 1/2/3.

In the first example, the multi-link element includes information that the link 1 and the link 2 operate based on STR, and the link 2 and the link 3 operate based on STR(1), so the information that the link 1 and the link 3 can also operate based on STR can be included.

The second example is an example in which the multi-link element indicates for all pairs, and assuming that the pair order is set to {link 1 and link 2}, {link 1 and link 3}, and {link 2 and link 3}, information that all pairs are operated based on STR (1) can be included.

Example 3: An Example of Indicating TID-to-Link Mapping

Figure 27:
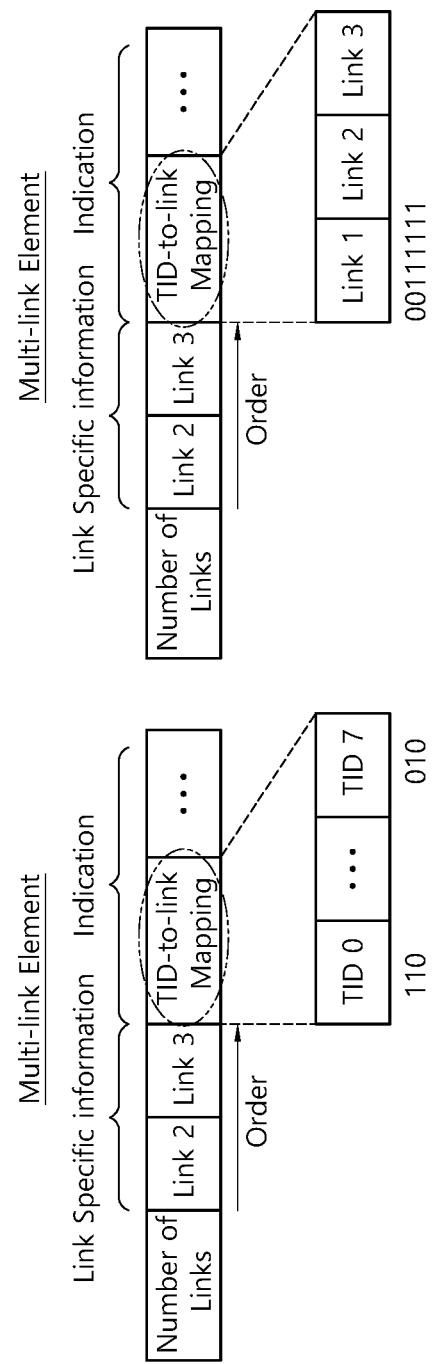
FIG. 27 is a diagram illustrating an embodiment of a multi-link element including TID and link-to-link mapping information.

FIG. 27 is a diagram illustrating an embodiment of a multi-link element including TID and link-to-link mapping information.

Referring to FIG. 27, the multi-link element includes information related to the link 2 and the link 3 in order, and shows TID-to-link mapping using a bitmap starting/considered from the link 1, which is an association link.

The figure on the left is an example of a bitmap for a link to which each TID is assigned. For example, if '110' is indicated for the TID 0, it means that the TID 0 is allocated to the link 1 and the link 2. The figure on the right is an example of the bitmap for the TID assigned to each link, and the link order is the same as indicated in the link-specific information. For example, if '001111111' is indicated for the link 1, it means that TIDs 2 to 7 are allocated to the link 1. While the method on the left and the right figure are different, the signaling overhead is the same.

Figure 28:
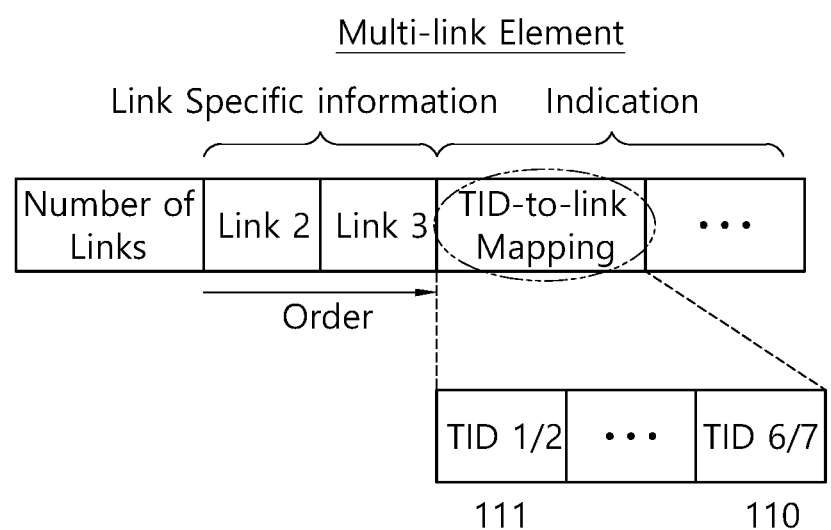
FIG. 28 is a diagram illustrating an embodiment of a multi-link element including TID and link-to-link mapping information.

FIG. 28 is a diagram illustrating an embodiment of a multi-link element including TID and link-to-link mapping information.

Referring to FIG. 28, the multi-link element includes information related to the link 2 and the link 3 in order, and shows TID-to-link mapping using a bitmap starting/considered from the link 1, which is an association link.

To reduce signaling overhead, two TIDs are bundled/grouped for each AC, and when '111' is indicated for TID 1/2 (i.e., AC_BK), it means that all links are allocated for the TID 1 and the TID 2.

An Example of Allowing Dynamic Indication

The fields mentioned above may pre-define fields that can be omitted for each AP MLD or non-AP MLD or frame. Alternatively, without defining this, it is possible to dynamically determine whether the field is present by using 1 bit in front of the above-mentioned field. In the present disclosure, this field may be referred to as a Present field.

Figure 29:
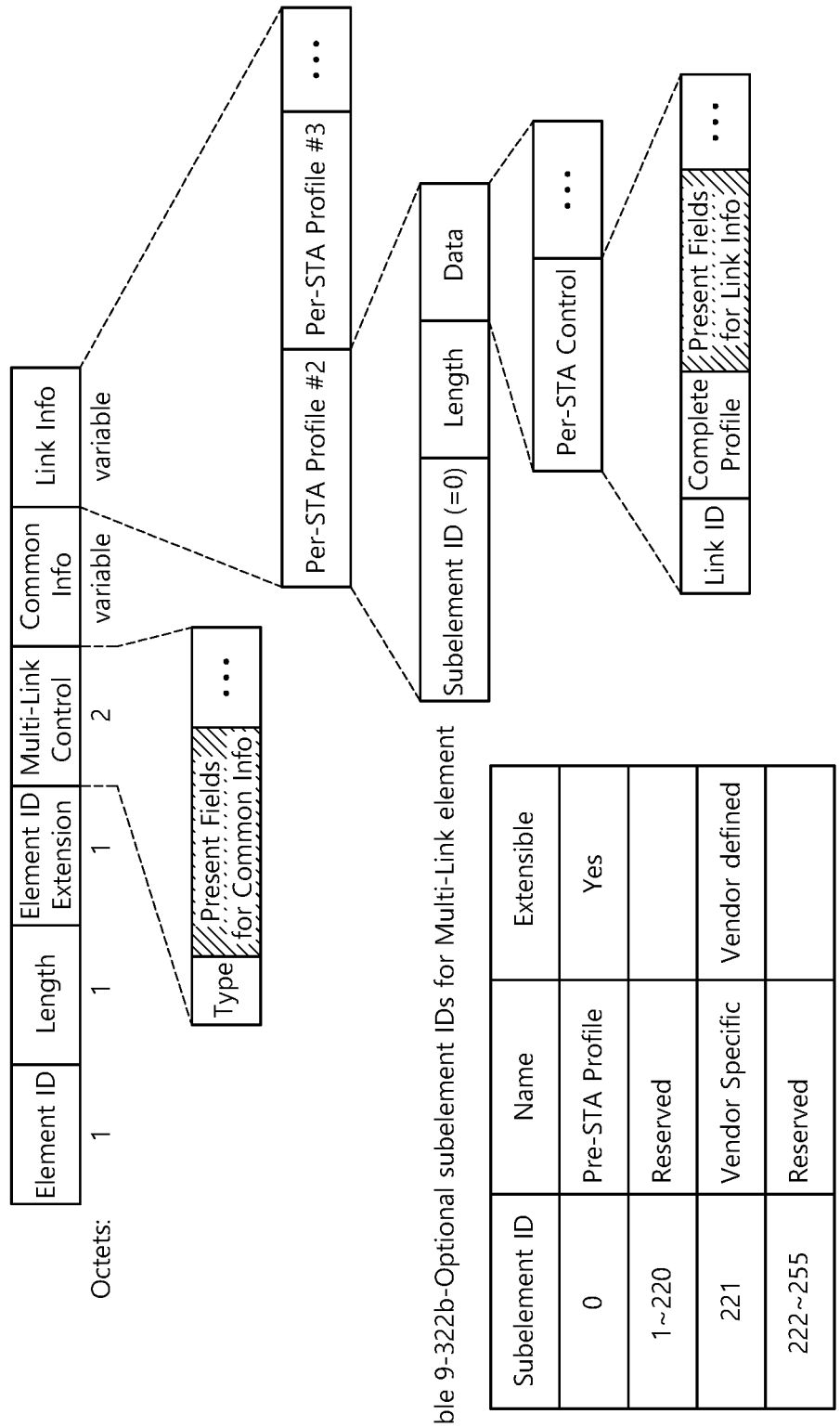
FIG. 29 is a diagram illustrating an embodiment of a present field of a multi-link element.

FIG. 29 is a diagram illustrating an embodiment of a present field of a multi-link element.

Referring to FIG. 29, an example of the integrated structure of the multi-link (ML) element described above is shown, and the multi-link element is basically composed of Common Info and Link Info. The Common Info includes common information among STAs in the MLD, and the Link Info includes specific information for each link (STA/AP) through the Per-STA Profile. The Present field may be present for the Common Info and the Link Info, respectively. The Common Info may be present in the Multi-link Control field, and the link Info may be present in the Per-STA Control field included in the Per-STA Profile. As mentioned above, these Present Fields can determine whether or not to include information according to the type (Type Subfield of the Multi-link Control field) of the multi-link element, purpose, and procedure. In this way, it is possible to avoid the inclusion of unnecessary information and to have a compact ML IE format suitable for each purpose. An example of this may be as follows.

Present Field #1: TID-to-Link Mapping

For example, if the bit in front of the TID-to-link mapping field (i.e., TID-to-link mapping present field) indicates '1', this field is present, and if '0' indicates this field it not present.

Figure 30:
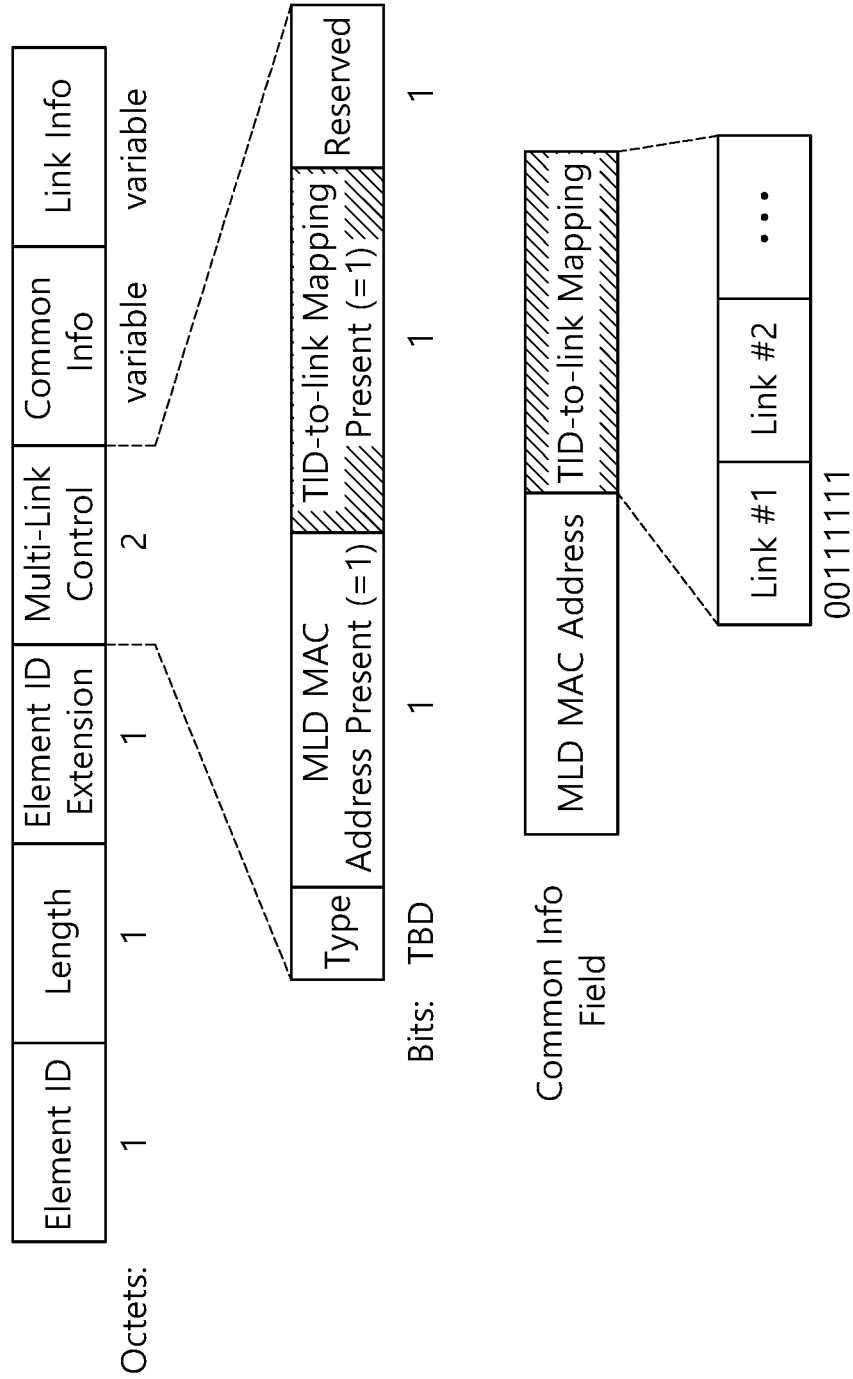
FIG. 30 is a diagram illustrating an embodiment of a TID-to-link Mapping present field.

FIG. 30 is a diagram illustrating an embodiment of a TID-to-link Mapping present field.

Referring to FIG. 30, the TID-to-link Mapping indication (i.e., the Example 3) and the Present field described above are shown. If the TID-to-link Mapping is located in the Common Info, the presence or absence may be indicated through the TID-to-link Mapping Present subfield of the Multi-link Control field. If the value of the Present subfield is '1', the TID-to-link Mapping field is present in the Common Info field. Basically, TID-to-link mapping is a default operation and separate signaling is not necessary, and since all TIDs are defined as mapped to all links, the present field may be useful if separate signaling is required.

Figure 31:
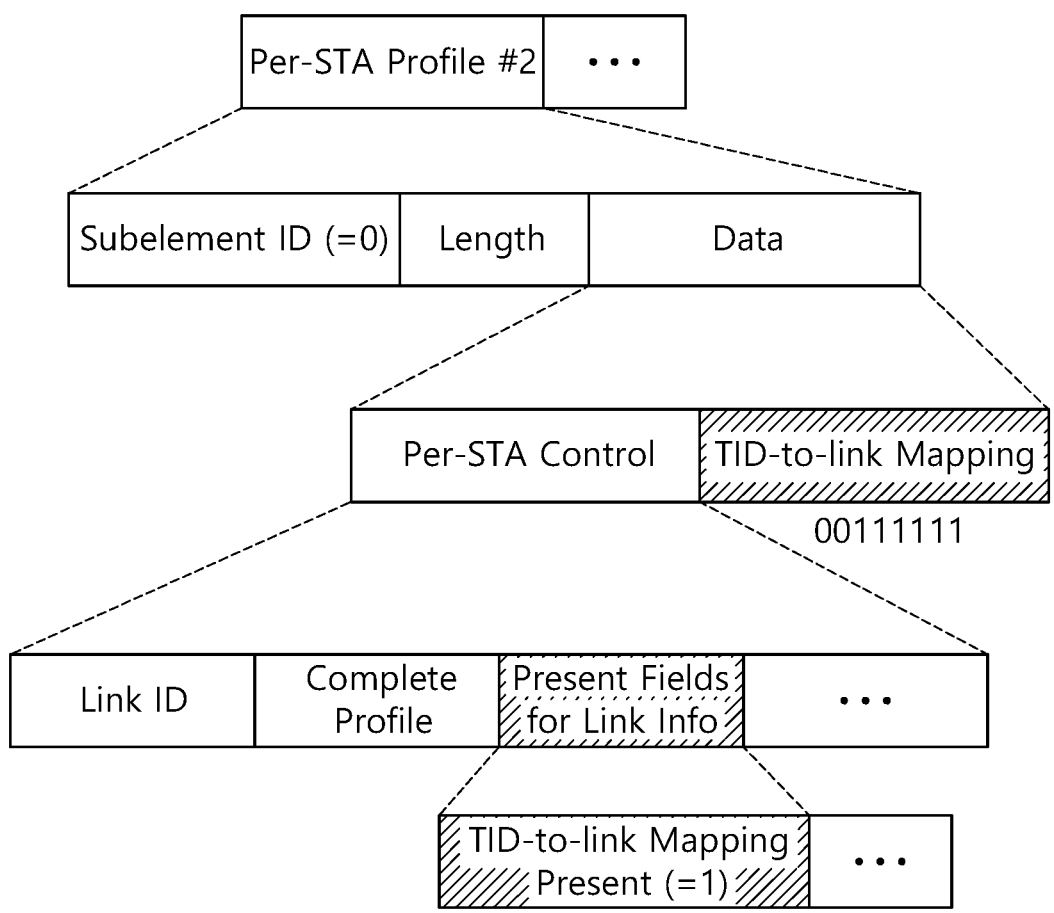
FIG. 31 is a diagram illustrating an embodiment of a TID-to-link Mapping present field.

FIG. 31 is a diagram illustrating an embodiment of a TID-to-link Mapping present field.

Referring to FIG. 31, an example of the Present field is shown when TID-to-link Mapping is indicated in the Link Info instead of the Common Info. FIG. 31 refers to FIG. 29. Similarly, presence or absence may be indicated through the TID-to-link Mapping Present subfield of the Per-STA Control field. If the value of this subfield is '1', the TID-to-link Mapping field is present in the Per-STA Profile.

If TID-to-link mapping for all setup links is indicated through the Present field in Common Info and implicitly indicated in the order of Link IDs, the overhead of sub-element ID, Link ID, Complete Profile, etc. included by default in the Link Info may be reduced. (e.g., FIG. 30). However, in the Per-STA Profile (e.g., FIG. 31), only a part of a specific link may be indicated through the Link ID, and in this case, the number of links to be indicated may be required in the Common Info. In addition, if the TID-to-link mapping is always carried together with other information, the Link Info that can indicate information for each link through link ID may be positionally appropriate.

Present Field #2: STR Capability

For example, if '1' is indicated in front of the STR Capability, this field is present, and if '0' is indicated, this field is not present.

Figure 32:
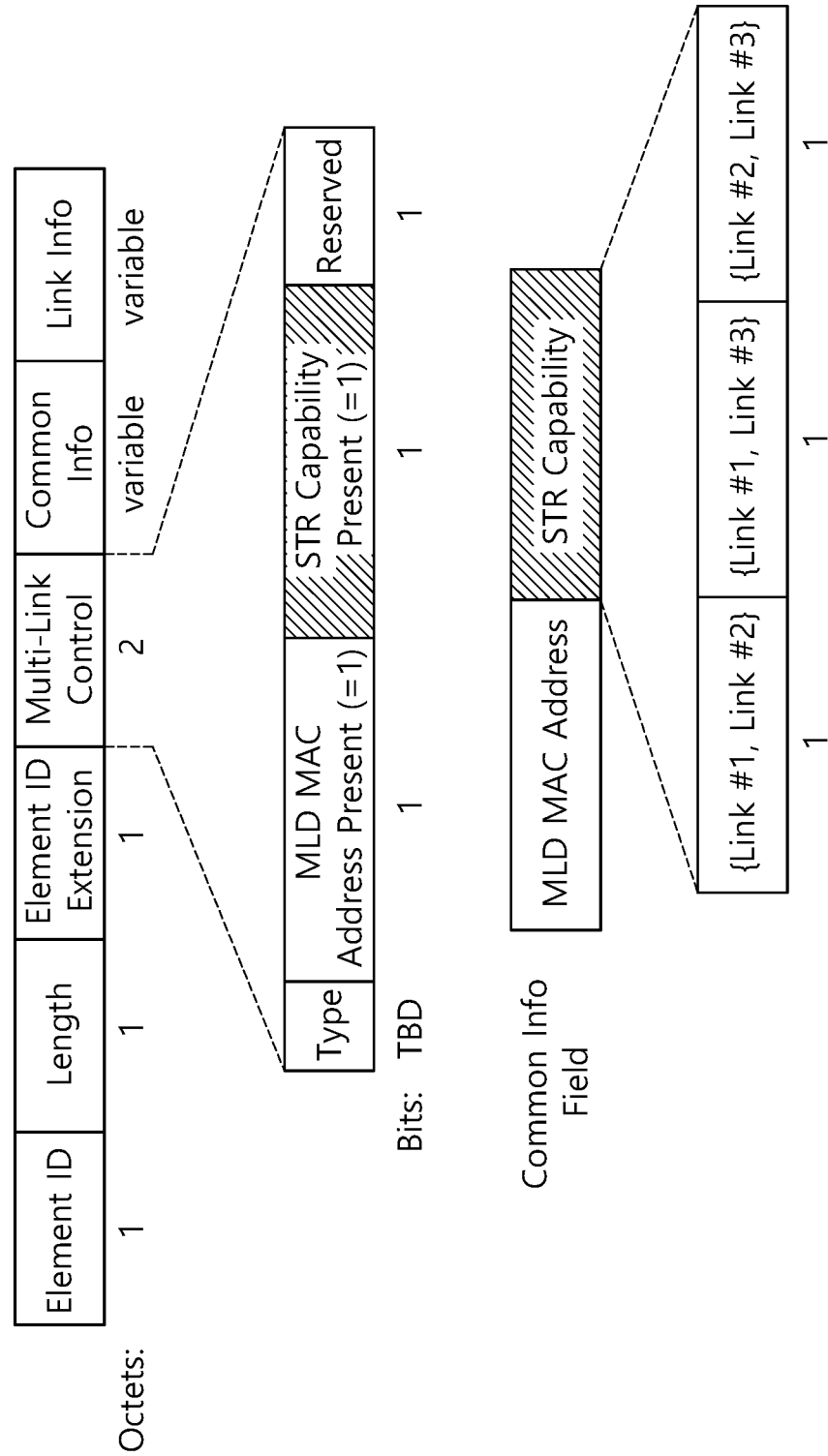
FIG. 32 and FIG. 33 are diagrams illustrating an embodiment of a simultaneous transmit and receive (STR) capability present field.
Figure 33:
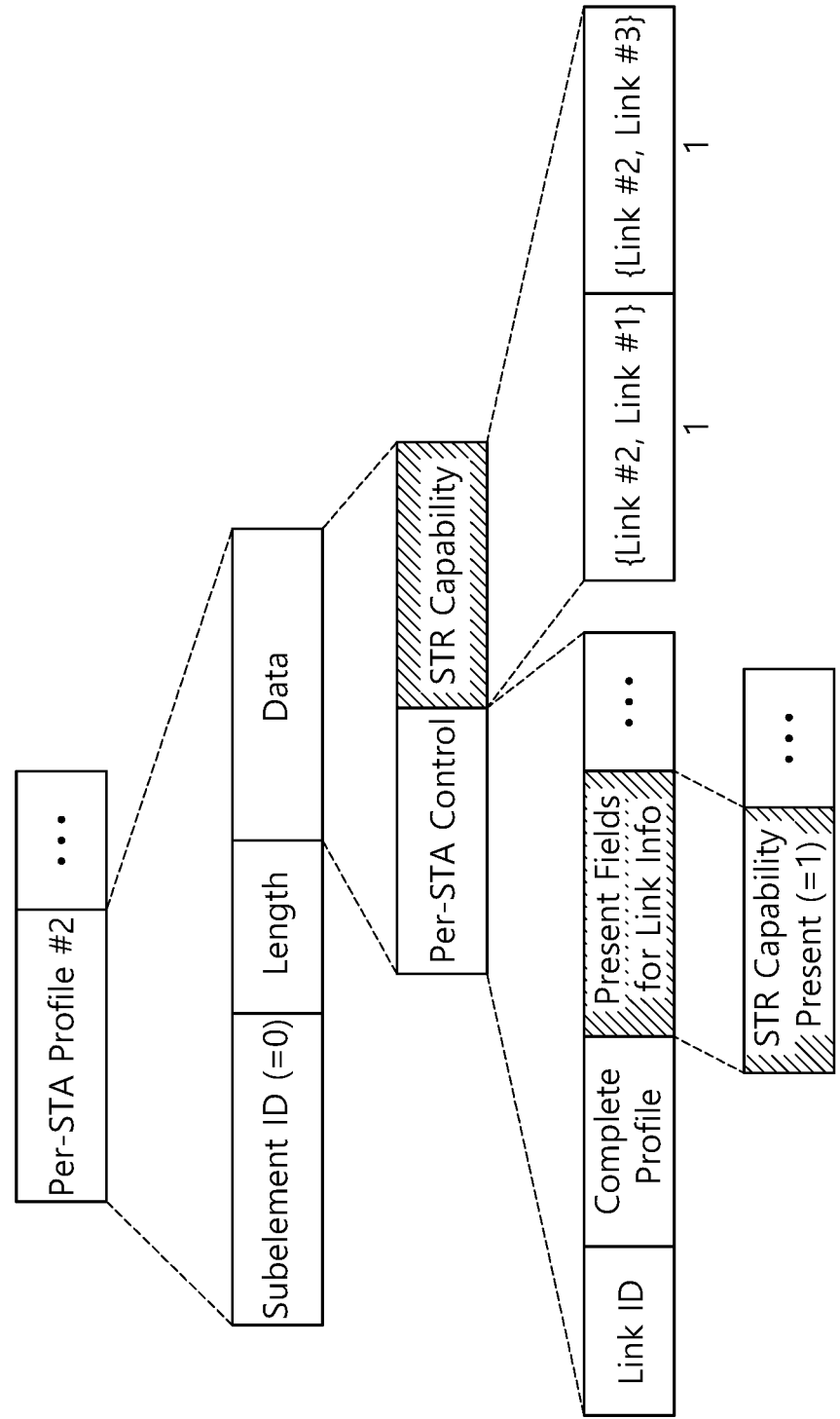

FIG. 32 and FIG. 33 are diagrams illustrating an embodiment of a simultaneous transmit and receive (STR) capability present field.

Referring to FIG. 32, the STR Capability indication (Simultaneous TX/RX (STR) of the Example 2) and the Present field described above are shown. If the STR Capability is located in the Common Info, the presence or absence may be indicated through the STR Capability Present subfield of the Multi-link Control field. If the value of the Present subfield is '1', the STR Capability field may be present in the Common Info field. If the MLD (e.g., the AP MLD) operates based on STR by default for all link pairs, separate signaling may not be required. Therefore, if there is a link pair that does not operate based on STR, this present field may be useful.

Referring to FIG. 33, an example of the Present field is shown when the STR Capability is indicated in the Link Info instead of the Common Info. FIG. 33 refers to FIG. 29. Similarly, presence or absence may be indicated through the STR Capability Present subfield of the Per-STA Control field. If the value of this subfield is '1', the STR Capability field is present in the Per-STA Profile. In this STR capability, only pairs with other links are indicated based on the link corresponding to the Per-STA. For example, if the link 2 is the standard of the Per-STA, it indicates the STR Capability for a pair of the link 2 and the link 1 and a pair of the link 2 and the link 3.

If the STR capability for all links is indicated through the Present field in Common Info, and the pairs are implicitly indicated (indicated as in Example 2) in the order of Link ID, sub-element ID, Link ID, Complete Profile included by default in Link Info overhead may be reduced. In addition, in the Link Info, redundancy may occur when viewed as a whole. (e.g., {Link #1, Link #2} and {Link #2, Link #1}. However, if this capability is indicated only when there is a (NSTR) link pair that does not operate based on STR, it may be difficult to distinguish pairs in the common info. Therefore, the method of indicating through the present field in the link info may be appropriate.

Present Field #3: Information Related to Association Link (i.e., Transmitting STA)

This may indicate the presence or absence of information related to the association link described above, that is the link (STA) that transmits the ML element.

Since the information related to the STA transmitting the ML element is included in the Management (Mgmt) frame (e.g., Beacon, Probe Response frame) including the multi-link element, most of the information may not be separately included in the ML element. However, it may be included in the ML element if it is not always included in the Mgmt frame (e.g., Change Sequence, link ID) or the STA requests partial information instead of complete information. If this information is included in the Per-STA Profile of the Link Info, a separate Present field is not required because the link ID is indicated and can already be identified. However, in order to reduce the default overhead of the Link Info mentioned above, the Present field may be included when included in the Common Info. In addition, if the above information is present due to the Present field having a value of '1', the information related to the transmitting STA may have one format.

Figure 34:
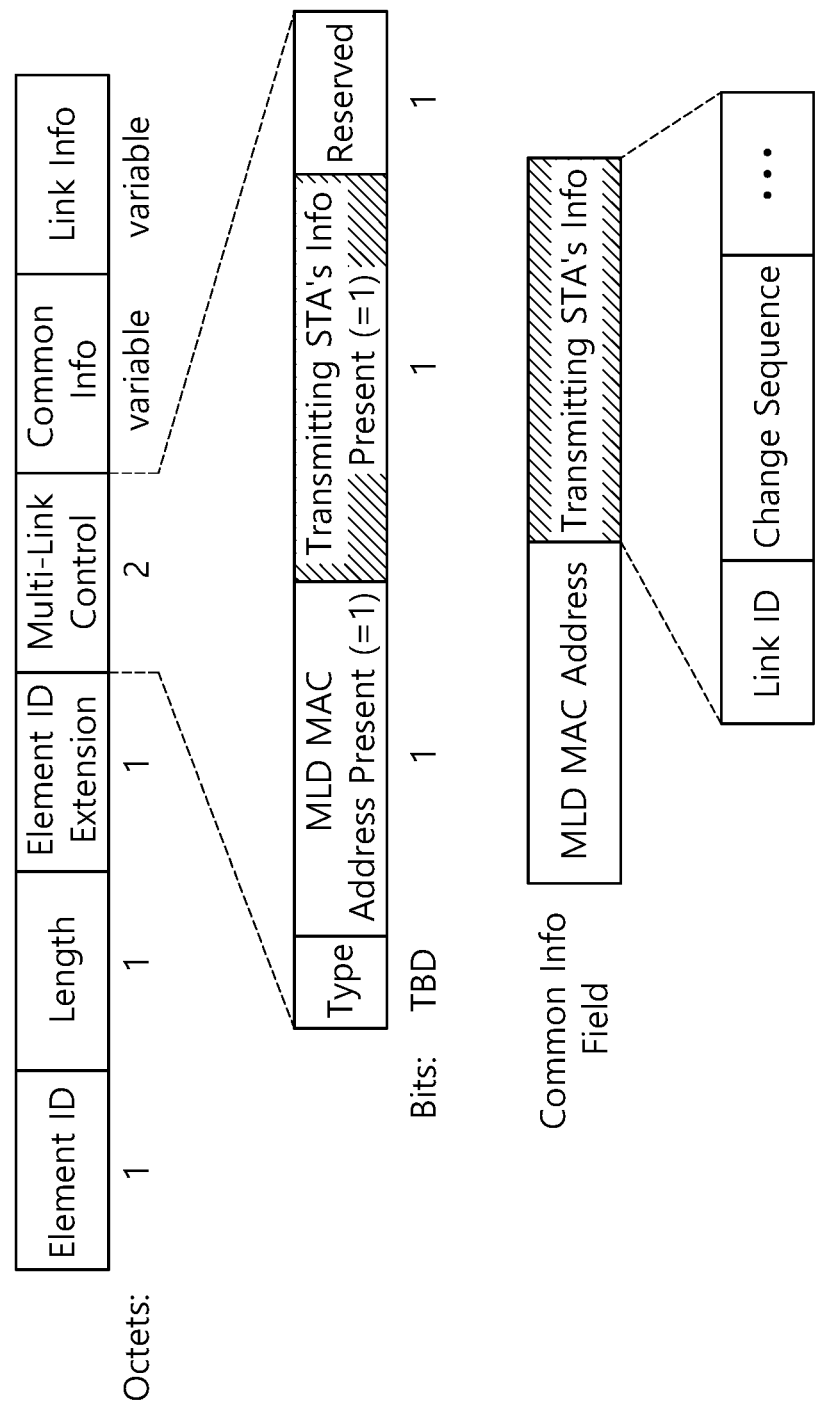
FIG. 34 is a diagram illustrating an embodiment of a present field for information of a transmitting STA.

FIG. 34 is a diagram illustrating an embodiment of a present field for information of a transmitting STA.

Referring to FIG. 34, an example of the Present field is shown when information related to a transmitting STA is indicated in the Common Info. The presence or absence may be indicated through the Transmitting STA's Info Present subfield of the Multi-link Control field. If the value of the Present subfield is '1', the Transmitting STA's Info field is present in the Common Info field. The Link ID, Change Sequence, etc. may be indicated in the Transmitting STA's Info, and may include additionally requested information, but this is not limited thereto.

Present Field #4: An Example of Indicating Information Related to Number of Links This information refers to the above-mentioned 1) Number of Supported links.

The number of supported link indicates the number of APs that can simultaneously exchange data frames (and/or management frame) for the AP MLD, and the number of non-AP STAs that can simultaneously exchange data frames (and/or management frames) for the non-AP MLD.

This information may be present depending on the Mgmt frame and its purpose, that is, it may be present when signaling affected by this information is present in the ML element. Further, this information may not be present when signaling affected by this information is not present. Therefore, the Present field may be present.

Figure 35:
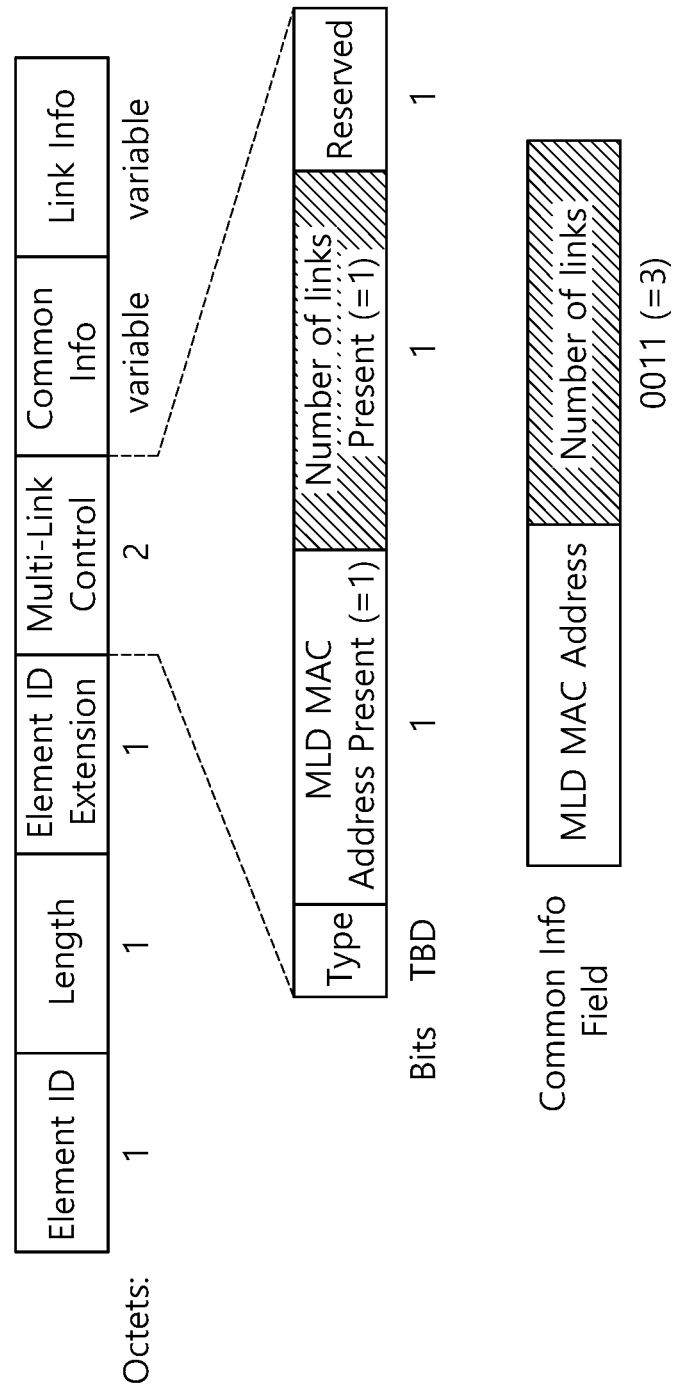
FIG. 35 is a diagram illustrating an embodiment of a number of links present field.

FIG. 35 is a diagram illustrating an embodiment of a number of links present field.

Referring to FIG. 35, when information related to the Number of links is indicated in the Common Info, an example of the Present field is shown. The Presence may be indicated through the Number of links Present subfield of the Multi-link Control field. If the value of this subfield is '1', the Number of links field is present in the Common Info.

If information related to all STAs (links) in the MLD is always included, the Number of links can be inferred from the number of Per-STA Profiles. However, the Present field may be required because there may be cases where it is not (e.g., when information on only some links is requested, or when information on all STAs is not always included in the case of association). In addition, the Number of links Present field may be required because whether or not to include a field affected by Number of links can be determined according to the type of the management frame including the ML element and the purpose of the ML element. For example, in non-AP MLD, when information related to a link to be received from an AP is not yet known, such as when transmitting a Probe Request frame during initial scanning, as mentioned above, because signaling for the STR capability or TID-to-link mapping affected by Number of links may not be performed, the Number of links field may not be required. However, if the MLD knows the link information like when transmitting an Association Request frame, and signaling for the STR capability or TID-to-link mapping is required, the Number of links is necessary. Therefore, the Number of links can be dynamically indicated through the Present field.

The signaling affected by the number of links field and the effect of this information are as follows.

TID-to Link Mapping and STR Capability

As mentioned in the above #1 and #2 of the Present field, the field size of the TID-to-link mapping and STR capability may vary depending on the Number of links. That is, if a TID bitmap is used in the TID-to-link mapping, the number of TID bitmaps varies according to the number of links, and if the STR is indicated according to pairs in the STR capability, the number of pairs varies according to the number of links. Therefore, the number of links can affect the size of these fields.

Figure 36:
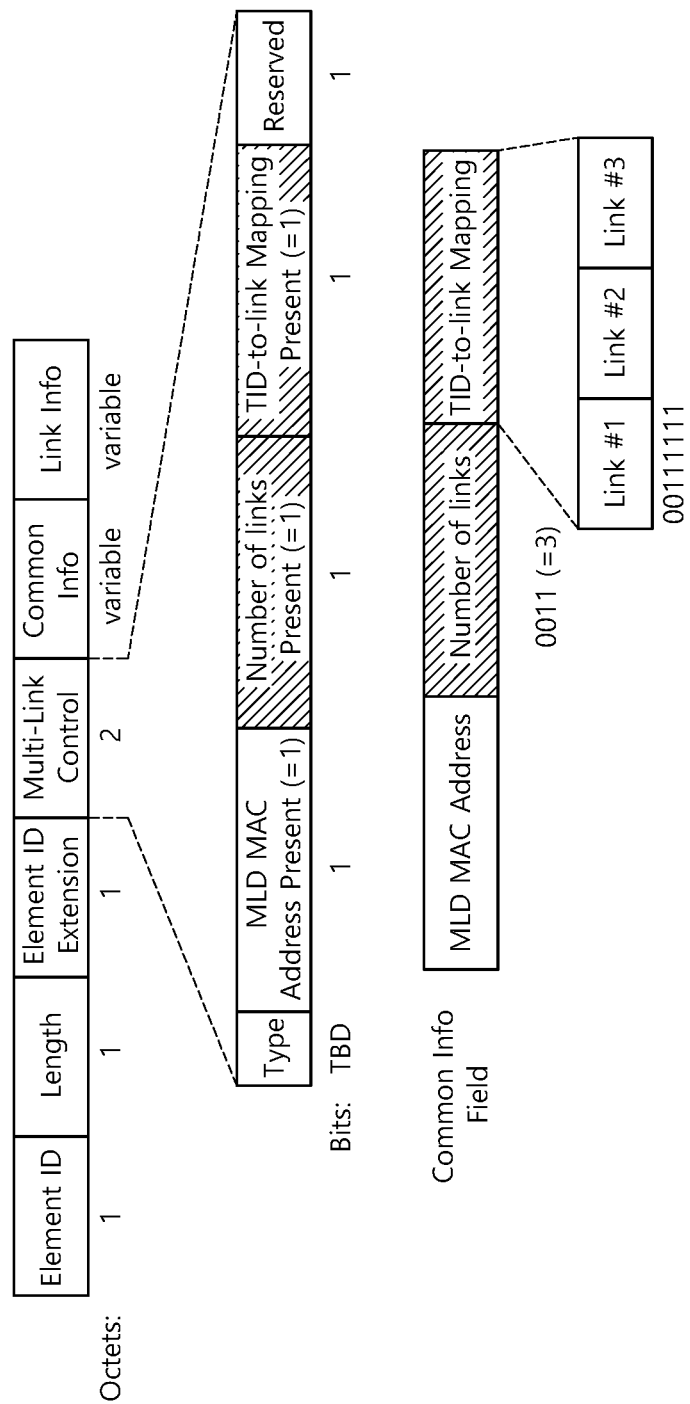
FIGS. 36 and 37 are diagrams illustrating an embodiment of TID-to-link mapping and STR capability field according to Number of links.
Figure 37:
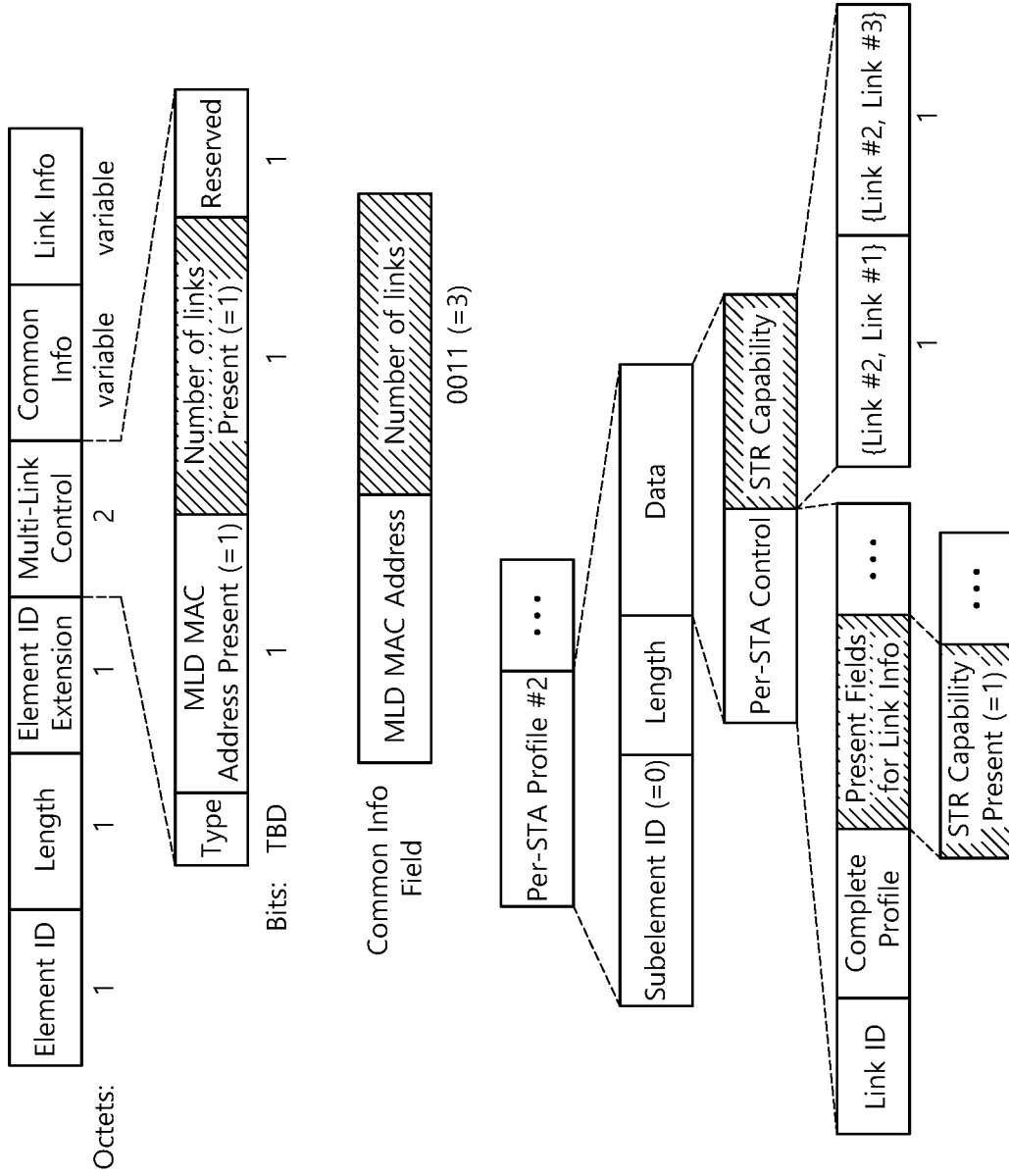

FIGS. 36 and 37 are diagrams illustrating an embodiment of TID-to-link mapping and STR capability field according to Number of links.

Referring to FIG. 36 and FIG. 37, when the number of links is '3' in both cases, when the TID-to-link mapping is included in the Common Info, three TID bitmaps (for Links #1, #2, #3) exist, and if the STR capability is included in the Link Info, the number of link pairs becomes '2' (i.e., {Link #2, Link #1} and {Link #2, Link #3}). For example, content and size included in the TID-to-link mapping field and the STR capability field may be affected according to the Number of links. That is, the content and size included in the TID-to-link mapping field and the STR capability field may be determined based on the Number of links.

Estimation of the Number of STAs that are not Setup

The Association Request frame includes information related to STAs requesting a setup (association) (in each Per-STA Profile), and the Association Response frame includes information related to APs to establish setup. That is, it does not include information related to all STAs. Therefore, when re-establishing a setup with an STA that is not setup after multi-link setup (e.g., link transition/switching), it is possible to know how many un-setup STAs exist through the Number of links before that, and use this to request information.

Figure 38:
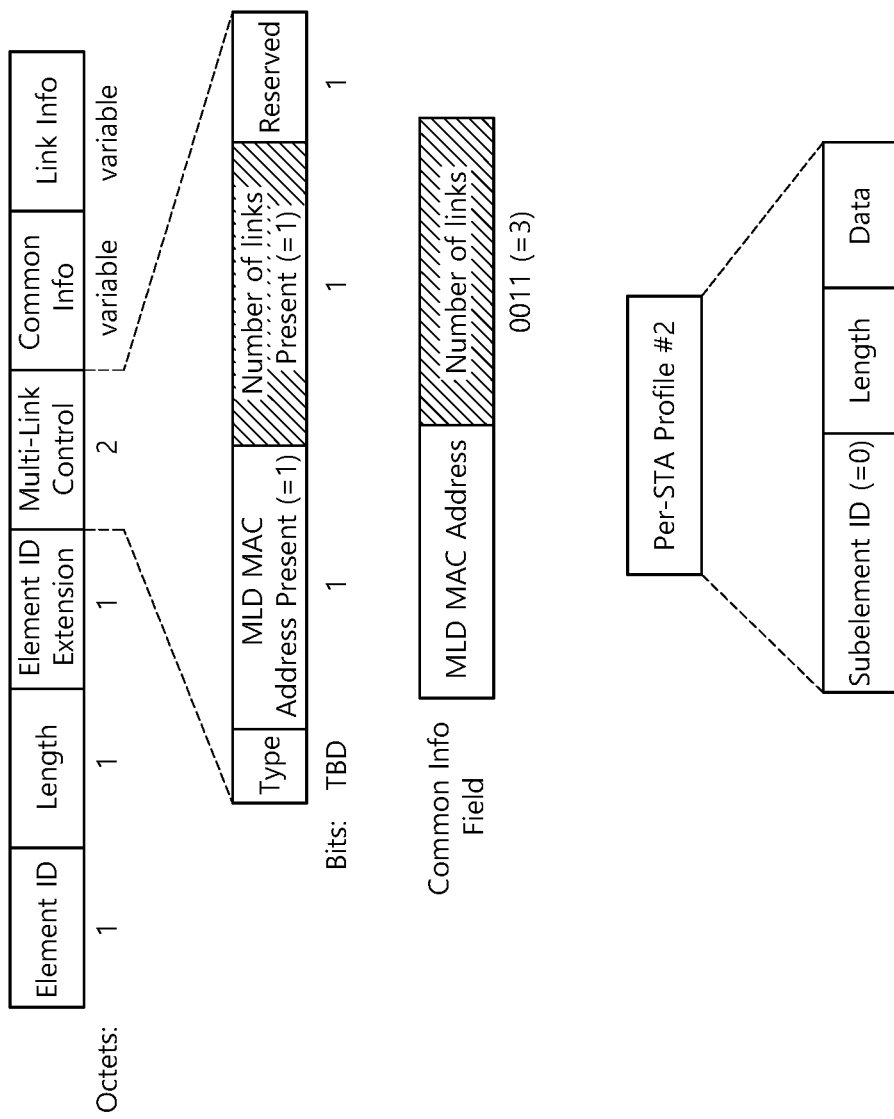
FIG. 38 is a diagram illustrating an embodiment of a multi-link element.

FIG. 38 is a diagram illustrating an embodiment of a multi-link element.

Referring to FIG. 38, the multi-link element may be included in an association request or association response frame. For example, when the Number of links is indicated as '3' in the ML IE included in the Association Request frame or Association Response frame and the number of Per-STA Profiles is '1', it can be seen that the number of STAs (i.e., STAs that do not want a setup) to which information is not indicated is one. For reference, it is assumed that the information on the STA transmitting this ML IE is basically included in the Association Request or Response frame.

As another example, since the non-AP does not indicate channel information, if '1' is indicated in front of the channel information field, this field is present, and if '0' is indicated, it is not present. Therefore, except for mandatory fields that should be present in all frames, the presence of fields that may be present or absent may be indicated through dynamic indication.

Fields that can be Included in Each Link Other than a Bitmap

Among the fields mentioned above, a bit value corresponding to each link in the bitmap may be included into each corresponding link field of link specific information. Although it is difficult to classify the relationship between links such as STR capability, a bitmap such as a primary link may indicate 1-bit each when information related to each link is provided. For example, if the bitmap related to the primary link is '100', '0' may be indicated by using 1-bit of information related to the link 2 of the link specific information, and '0' may be indicated by using 1-bit in the link 3 as well.

An Example of Replacing a Part of a Multi-Link Element or a Sub-Element of Another Element Some of the information of the multi-link element may be replaced with other existing elements. However, when an existing element is used, fields that are not necessarily required may be present, which may result in an overhead.

The element that can be replaced may include 1) a neighbor report element, 2) a reduced neighbor element, and 3) a multi-band element.

1. Neighbor Report Element

This element can basically indicate channel information by operating class, channel number, etc., and can additionally include a lot of information by using an optional sub-element. Currently, the optional sub-element includes the following information.

TABLE 8

| Subelement ID | Name | Extensible |
| --- | --- | --- |
| 0 | Reserved | |
| 1 | TSF Information | Yes |
| 2 | Condensed Country String | Yes |
| 3 | BSS Transition Candidate Preference | No |
| 4 | BSS Termination Duration | No |
| 5 | Bearing | No |
| 6 | Wide Bandwidth Channel | Yes |
| 7-38 | Reserved | |
| 39 | Measurement Report | Subelements |
| 40-44 | Reserved | |
| 45 | HT Capabilities subelement | Yes |
| 46-60 | Reserved | |
| 61 | HT Operation subelement | Yes |
| 62 | Secondary Channel Offset subelement | |
| 63-65 | Reserved | |
| 66 | Measurement Pilot Transmission | Subelements |
| 67-69 | Reserved | |
| 70 | RM Enabled Capabilities | Yes |
| 71 | Multiple BSSID | Subelements |
| 72-190 | Reserved | |
| 191 | VHT Capabilities | Yes |
| 192 | VHT Operation | Yes |
| 193-220 | Reserved | |
| 221 | Vendor Specific | Vendor defined |
| 222-255 | Reserved | |

In 11ax, HE Capabilities/Operation element, BSS load/HE BSS load, and SSID were additionally included.

The EHT may also include a lot of information using the reserved ID. Therefore, 1) if the EHT capabilities/operation element is defined in 11be, all capabilities and operation-related information can be added to the reserved part above, or 2) if only necessary information for data exchange with other links is entered, it can be added to the reserved part above in the form of "reduced EHT capabilities/operation element" by composing only the relevant field. These elements may include information related to the above-described multi-link element.

If a part of the multi-link element is replaced by using the neighbor report element as above, it can be configured as follows, but is not limited thereto. Corresponding configuration fields may not be included according to frame type/operation.

(1) An example of indicating link specific information using a neighbor report (NR) element FIG. 39 is a diagram illustrating an embodiment of an NR element.

Each NR element indicates whether it is for multi-link (ML) or not, or indicates whether or not it is for ML in the order of the NR element using the ML indication as shown in FIG. 39 (e.g., '0011' wherein '1' is used for the NR element in the ML). If this ML indication is included in the NR element, it is not necessarily included.

(2) The operation-related field between the links described above, such as Indication regarding multi-link operation, may also be indicated as follows. The following information can be indicated by additionally utilizing a new element in the BSSID Information field reserved bit of this element or the above optional sub-element.

1) This can simply express whether a link is a link (e.g., selected operating link, primary link) or not.

Ex) It is set to '1' if the link is selected for multi-link operation, and set to '0' otherwise.

Ex) it is set to '1' if the link is a primary link that is prioritized for power saving, channel access, etc., and set to '0' otherwise.

2) If the relationship is expressed in terms of multi-link operation with other links as in the above-explained Example 2, it can be expressed except for itself.

Ex) If this neighbor report is for the link 2, only the relationships with the link 1 and the link 3 are indicated. The STR is indicated by '1' and non-STR is indicated by '0'. A STR relationship between the Link 1 and the Link 2 and a STR relationship between the Link 3 and the Link 3 are indicated by '11'.

3) An exampling of indicating whether the neighbor report element is for multi-link Ex) It is set to '1' for Multi-link, and set to '0' for Legacy.

Since the above information should also be included in the link that transmits these elements, the EHT capabilities/operation element or a new element should be defined and included.

If the multi-link element is replaced by using the neighbor report element as above, it can be configured as the following example, but is not limited thereto.

Example 1: Link Selection

When a corresponding link such as an operating link or a primary link is selected for a certain operation/feature, it can be indicated with a bit.

Figure 40:
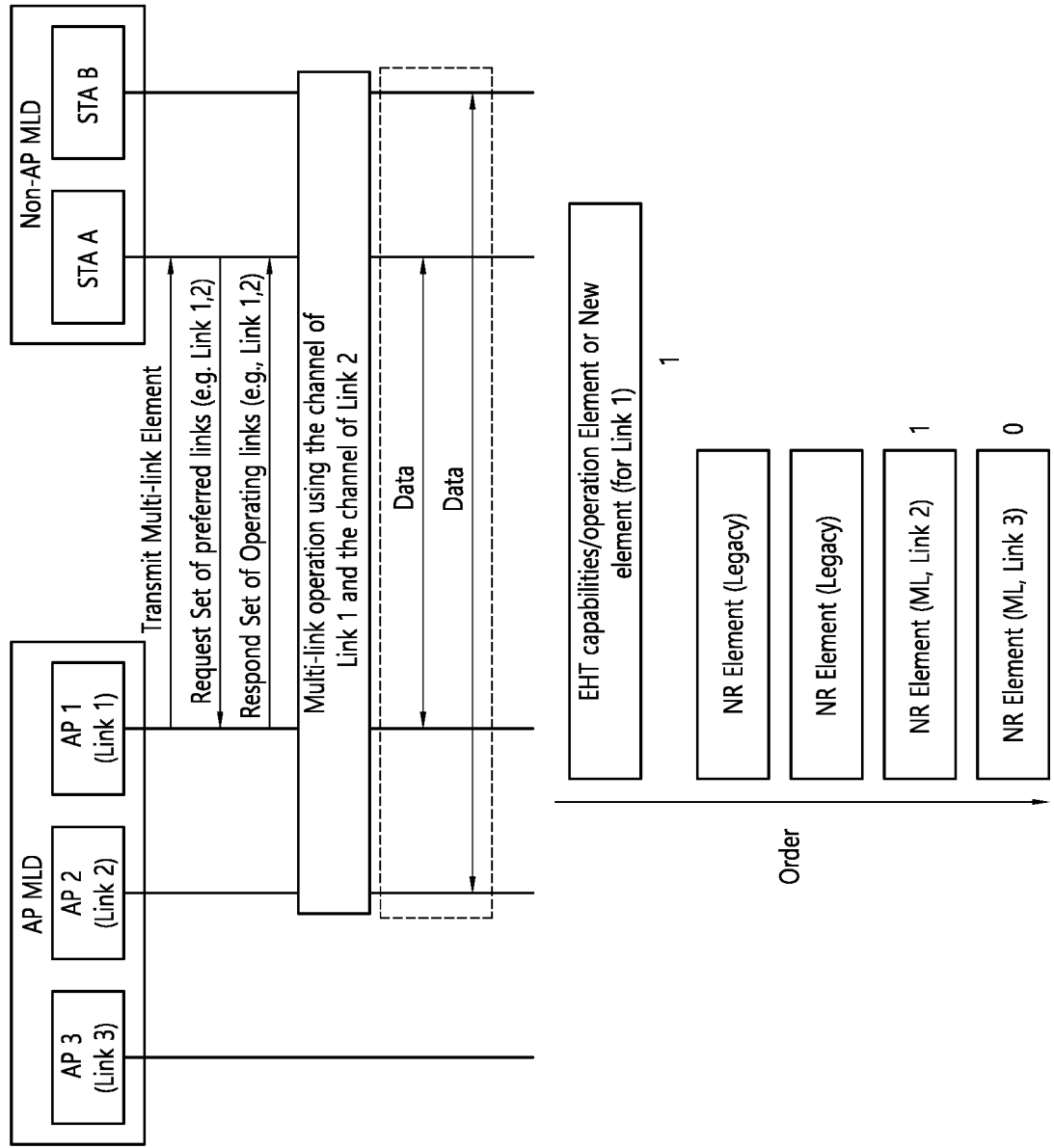
FIG. 40 is a diagram illustrating an embodiment of a method of indicating an operating link.

FIG. 40 is a diagram illustrating an embodiment of a method of indicating an operating link.

Referring to FIG. 40, a neighbor element, not a multi-link element, includes information related to the Link 2 and the Link 3 in order, and a STA A requests the link 1 and the link 2 as an operating link, and an AP 1 responds to the request. In this case, '1' is indicated in the NR element of the link through which the element is being transmitted, and thus '1' is indicated for the NR element of the link 2.

Figure 41:
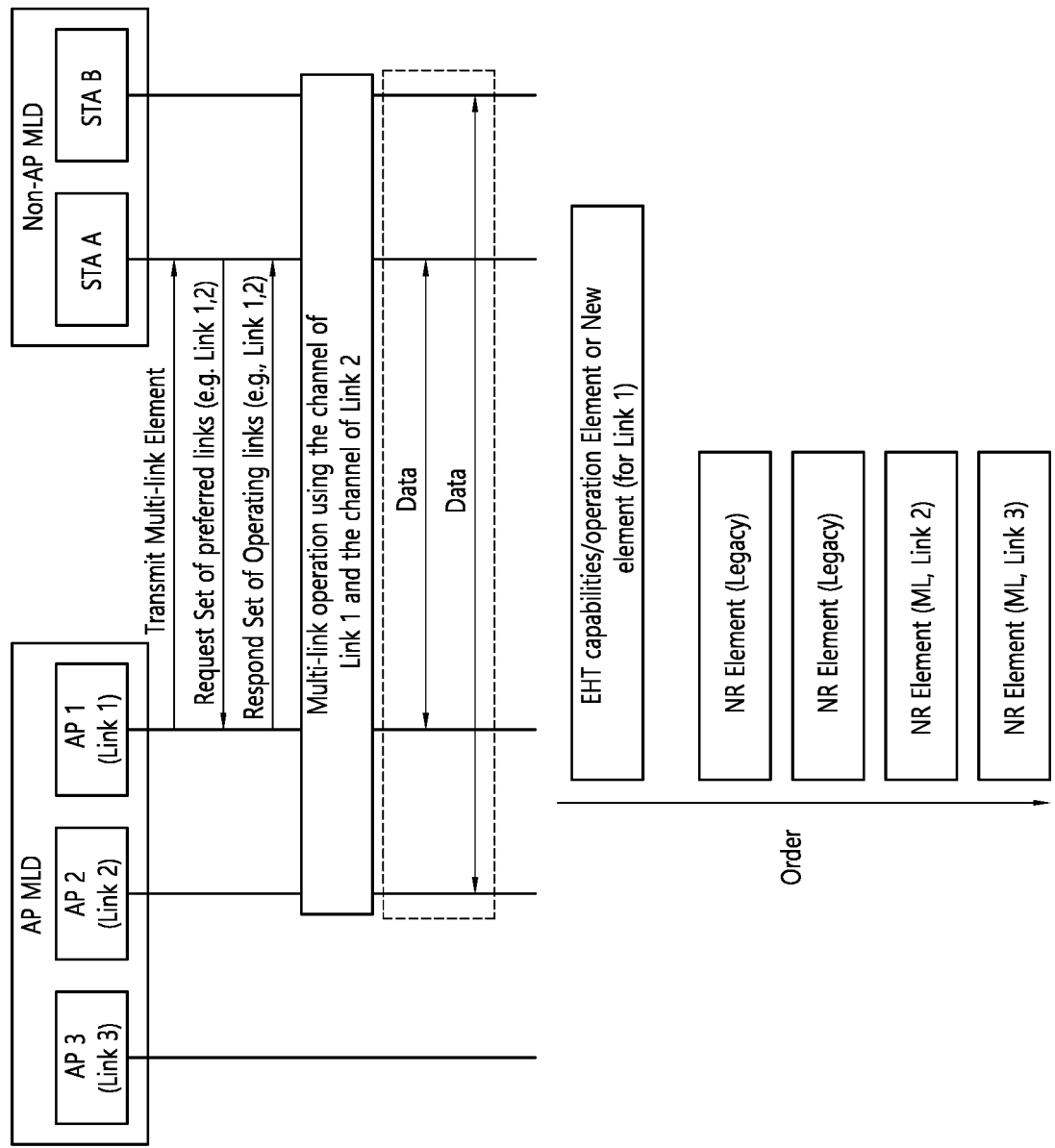
FIG. 41 is a diagram illustrating an embodiment of a method for indicate a link set in a Single BA Agreement.

FIG. 41 is a diagram illustrating an embodiment of a method for indicate a link set in a Single BA Agreement.

Referring to FIG. 41, instead of the multi-link element, the neighbor element includes information related to the link 2 and the link 3 in order, and a STA A is negotiating with an AP to use a BA for the TID 1 in the link 1 and the link 2. In this case, the link set can be indicated by using a bitmap in the order of the link 1 (transmitting the element), the link 2, and the link 3. Accordingly, the STA A may indicate '110' to request the AP using an ADDBA frame, and the AP may confirm the success (with bitmap '110') as it is.

Example 2: An Example of Indicating STR Capability

Figure 42:
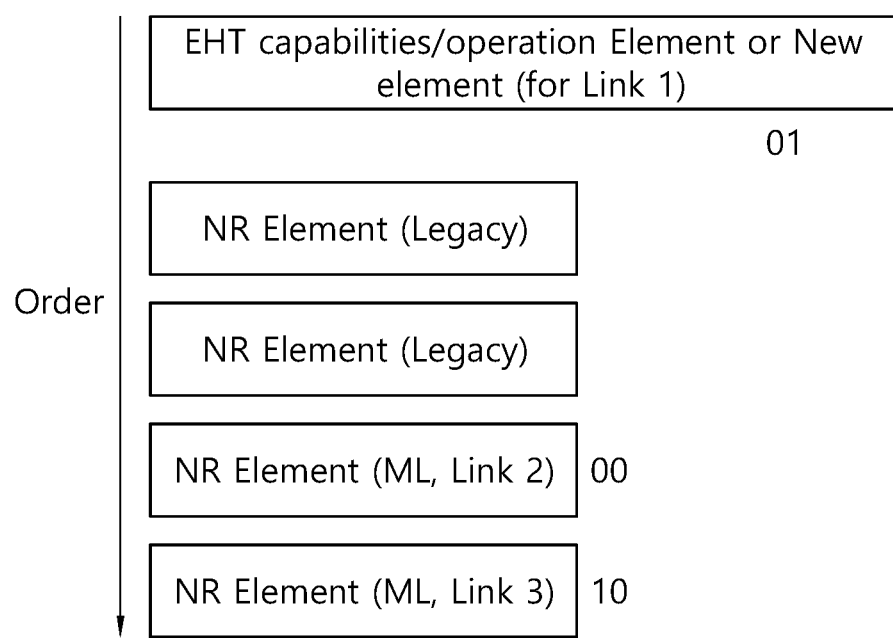
FIG. 42 is a diagram illustrating an embodiment of a method of indicating STR capability.

FIG. 42 is a diagram illustrating an embodiment of a method of indicating STR capability.

Referring to FIG. 42, information related to the Link 2 and information related to the Link 3 are sequentially included using the NR element, and the STR capability for link(s) 1/2/3 can be indicated ('1' for STR, '0' for non-STR). The STA may indicate for each link in the form of a pair in order for links other than itself. The first one is '01' (the link 1 and the link 2, the link 1 and the link 3) when indicated by the element for the link 1, so it is indicated that the link 1 and the link 2 do not support the STR, and the link 1 and the link 3 operate based on the STR. For the NR element for the link 2, it is set to '00', so it is indicated that the link 2 does not support the STR for both the link 1 and the link 3. Finally, for the NR element for the link 3, it is set to '10', so it is indicated that the link 3 has non-STR with the link 2 and has STR with the link 2.

2. Reduced Neighbor Element

The reduced neighbor element may include information related to several APs. Basically, since each neighbor AP information can include channel information and TBTT information, it can indicate a part of the multi-link element presented above.

Figure 43:
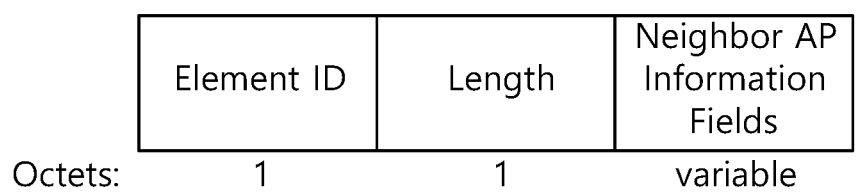
FIG. 43 is a diagram illustrating an embodiment of a reduced neighbor element.

FIG. 43 is a diagram illustrating an embodiment of a reduced neighbor element.

Referring to FIG. 43, information of the multi-link element may be indicated by partially modifying the reduced neighbor report element. A TBTT Information field is present in the Reduced Neighbor report element, and the TBTT Information field can have a field size of up to 255 octets through the indication of the TBTT Information length field. However, the reduced neighbor report element can be configured to be variable with sub-element, but if the length is specified in the TBTT information Length field and ML information is indicated using the TBTT Information field, since the length is determined, there can be a problem in that it is difficult to indicate variable values according to the number of links. To improve this, there may be a method of specifying it in the form of range or specifying the maximum length value and indicating within it.

1) For Legacy or for Multi-Link

First, in order to determine whether information related to each neighbor AP is for legacy or ML, a reserved bit of the TBTT Information Header or a TBTT Information field may be used.

2) EHT Capability/Operation Element or Reduced EHT Capability/Operation Element (e.g., the Above-Mentioned Multi-Link Element)

The above-mentioned (reduced) capability/operation element can also indicate a length that matches the field size if the size is determined, but it is difficult to set the correct length since the relationship between links such as STR capability is variable. However, such a variable field is indicated separately, and it is possible if the TBTT information field is used for the fixed field. Next, FIG. 44 is an example in which the entire field consists of 20 octets.

Figure 44:
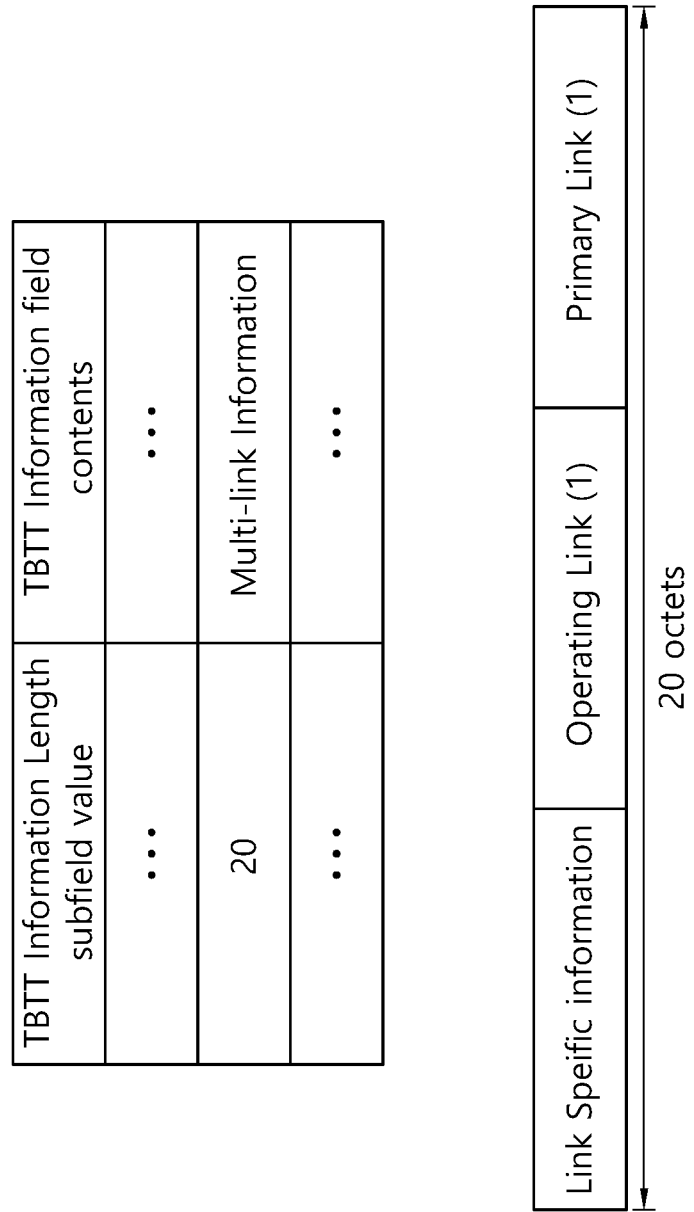
FIG. 44 is a diagram illustrating an embodiment of TBTT Information.

FIG. 44 is a diagram illustrating an embodiment of TBTT Information.

Referring to FIG. 44, the TBTT Information field may include multi-link information. A reserved bit may be present among 20 octets, the operation link value is set to '1' and the primary link value is set to '1', and the neighbor AP information including this field is link information for ML, and is a link selected for ML operation and an example selected as the primary link.

Figure 45:
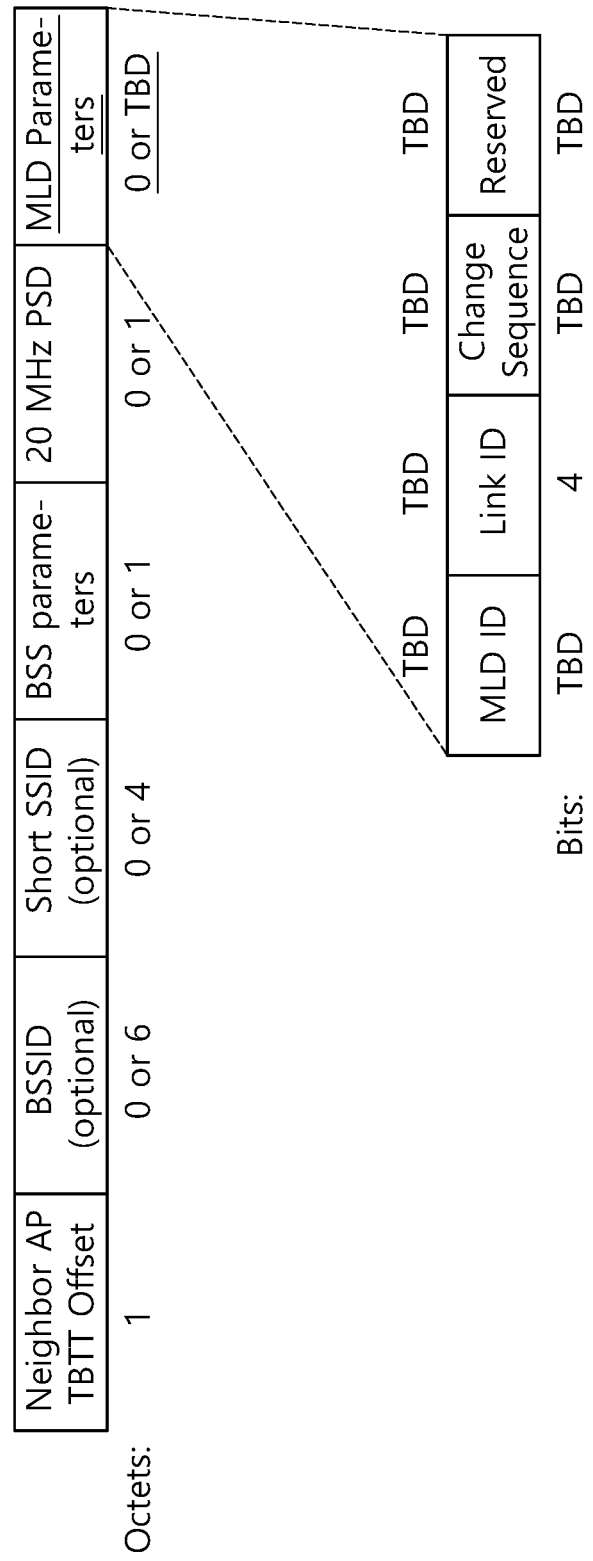
FIG. 45 is a diagram illustrating an embodiment of the format of the TBTT Information field.

FIG. 45 is a diagram illustrating an embodiment of the format of the TBTT Information field.

Referring to FIG. 45, the MLD ID may correspond to the above-mentioned 1) For Legacy or For Multi-link, and the Link ID and Change Sequence may correspond to the link specific information. That is, through this field, it can be known whether it belongs to an MLD, and which MLD it belongs to. Basically, this information can be found through multi-link discovery, and the following shows the process of establishing the multi-link setup with the MLD to which the AP that performed the discovery belongs.

Figure 46:
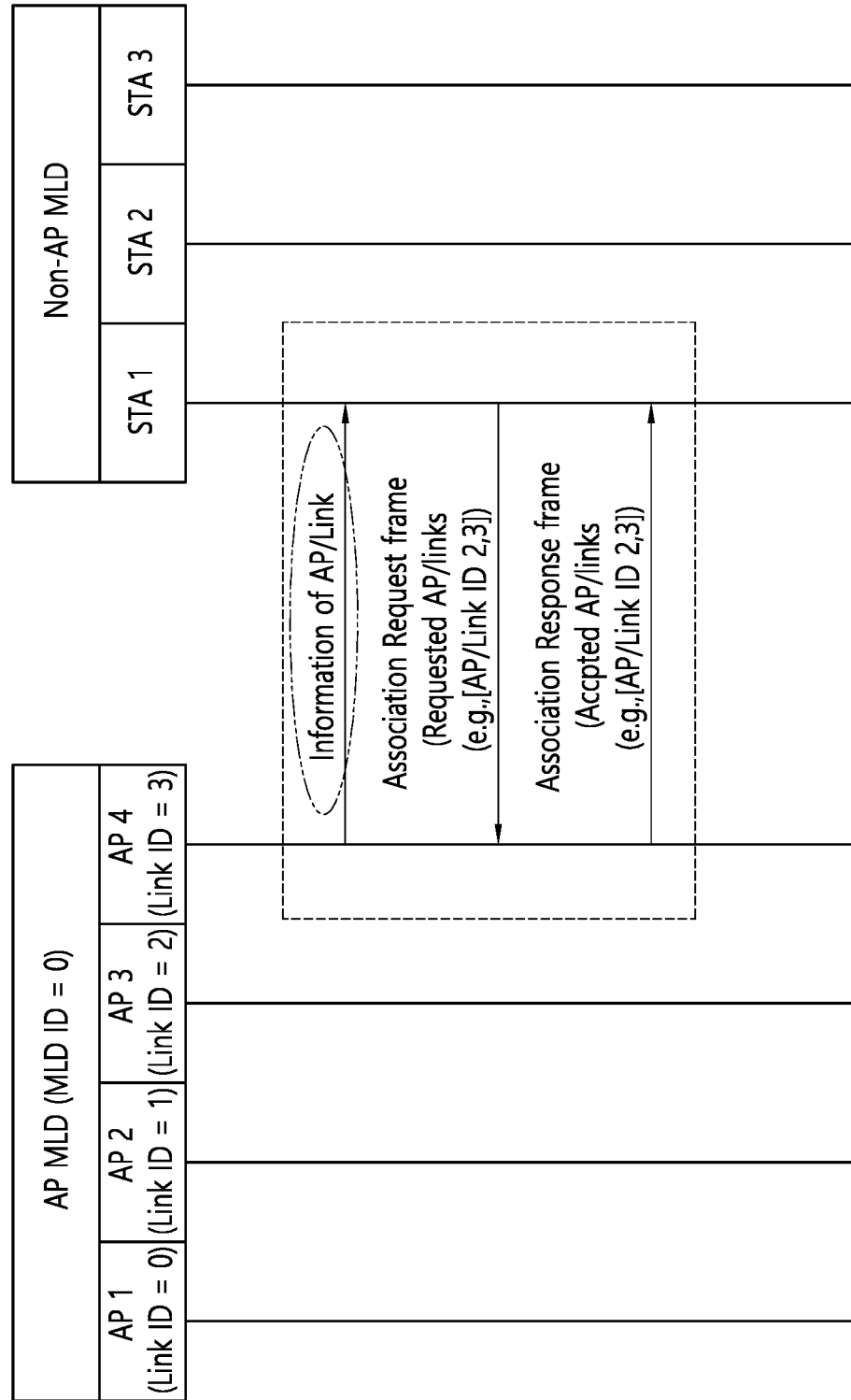

FIG. 46 and FIG. 47 are diagrams illustrating a process of establishing a multi-link setup with an MLD to which an AP that has performed discovery belongs and an embodiment of a reduced neighbor report (RNR).

Referring to FIG. 46 and FIG. 47, a STA 1 of the non-AP MLD may establish a multi-link setup with the MLD to which the AP (AP 4) that has performed discovery belongs. Assuming that the ID of the MLD to which the AP transmitting the RNR element belongs is '0', the STA 1 may determine whether the APs having the MLD ID '0' (AP1, AP2, AP3) belong to the same MLD as the AP 4 transmitting the RNR element. In addition, since each AP is distinguished through the link ID, the request can be made by including the link ID in the Association Request frame. Another APs may belong to an MLD with the same MLD ID '3', and their link IDs may be also differentiated. Meanwhile, when performing multi-link setup with said another APs, an association request may be performed by moving to a corresponding channel with information related to the APs for the corresponding MLD ID.

Figure 48:
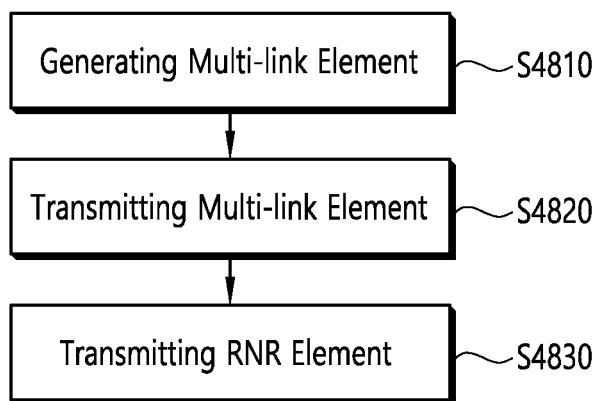
FIG. 48 is a flowchart illustrating an embodiment of a method of operating a transmitting MLD.

FIG. 48 is a flowchart illustrating an embodiment of a method of operating a transmitting MLD.

Referring to FIG. 48, the transmitting MLD may generate a multi-link element (S4810). For example, the multi-link element may include a multi-link control field, a common info/information field, and a link info/information field. And, the multi-link control field may include a first present field related to presence of a number of links field, and the common information field may include the number of links field based on the first present field.

For example, the link information field includes a per-STA control field for each station (STA), the per-STA control field includes a second present field related to presence/absence of a TID-to-link mapping field, the link information field may further include the TID-to-link mapping field based on the second present field. The TID link mapping field may include information related to a TID assigned to each link.

For example, the link information field may include a per-STA control field, the per-STA control field may include a third present field related to presence/absence of a Simultaneous Transmit and Receive (STR) capability field, the link information field may further include the STR capability field based on the third present field, and the STR capability field may include information related to whether each link supports STR.

For example, the number of links field may include information related to a number of links through which the transmitting MLD is able to simultaneously perform physical protocol data unit (PPDU) exchange.

For example, the multi-link element may be transmitted through an association link, the multi-link control field may further include a fourth present field related to presence/absence of an association link information field, the common information field may further include the association link information field based on the fourth present field, and the association link information field may include a link identifier (ID) subfield and a TID-to-link mapping field.

For example, wherein the size of the TID-to-link mapping field may be determined based on the number of links field.

Number of supported links: This indicates the total number of supported links.

Ex) When using a Bitmap and the total number of links is set to '3', the above content can be set to '11' if association link is included and '10' if not included.

The number of supported links may mean the number of APs that can simultaneously exchange data frames (and/or management frames) by the AP MLD, and the number of non-AP STAs that can simultaneously exchange data frames by the non-AP MLD. The technical effect obtained by indicating this value in the multi-link (ML) element will be separately described in the Present field below.

The multi-link element may include a number of links field, a Link Specific information field, and an Indication regarding ML operation field. The Link Specific information field may include ID, Channel Information, Assisted information, and Capability fields.

The multi-link element may be applied to the following examples.

Example 1: An Example for Indicating a Link Set

The multi-link element can be used when requesting/responding an operation link and determining the primary link described above.

It can be indicated in the form of a bitmap by using the order of the indicated links.

The multi-link element includes information related to the link 2 and the link 3 in order, a STA A requests the link 1 and the link 2 as an operating link, and an AP 1 responds to the request. In this case, the link set can be indicated by using a bitmap in the order of the link 1 (transmitting the element), the link 2, and the link 3. Therefore, the STA A may request the AP by indicating the bitmap of '110', and the AP may confirm the bitmap of '110'.

Example 2: An Example of Indicating STR Capability

The Multi-link Element includes information on the link 2 and the; ink 3 in order, and may indicate STR capability for link(s) 1/2/3.

In the first example, the multi-link element includes information that the link 1 and the link 2 operate based on STR, and the link 2 and the link 3 operate based on STR(1), so the information that the link 1 and the link 3 can also operate based on STR can be included.

The second example is an example in which the multi-link element indicates for all pairs, and assuming that the pair order is set to {link 1 and link 2}, {link 1 and link 3}, and {link 2 and link 3}, information that all pairs are operated based on STR (1) can be included.

Example 3: An Example of Indicating TID-to-Link Mapping

The multi-link element includes information related to the link 2 and the link 3 in order, and shows TID-to-link mapping using a bitmap starting/considered from the link 1, which is an association link.

The figure on the left is an example of a bitmap for a link to which each TID is assigned. For example, if '110' is indicated for the TID 0, it means that the TID 0 is allocated to the link 1 and the link 2. The figure on the right is an example of the bitmap for the TID assigned to each link, and the link order is the same as indicated in the link-specific information. For example, if '001111111' is indicated for the link 1, it means that TIDs 2 to 7 are allocated to the link 1. While the method on the left and the right figure are different, the signaling overhead is the same.

The multi-link element includes information related to the link 2 and the link 3 in order, and shows TID-to-link mapping using a bitmap starting/considered from the link 1, which is an association link.

To reduce signaling overhead, two TIDs are bundled/grouped for each AC, and when '111' is indicated for TID 1/2 (i.e., AC_BK), it means that all links are allocated for the TID 1 and the TID 2.

An Example of Allowing Dynamic Indication

The fields mentioned above may pre-define fields that can be omitted for each AP MLD or non-AP MLD or frame. Alternatively, without defining this, it is possible to dynamically determine whether the field is present by using 1 bit in front of the above-mentioned field. In the present disclosure, this field may be referred to as a Present field.

The multi-link element is basically composed of Common Info and Link Info. The Common Info includes common information among STAs in the MLD, and the Link Info includes specific information for each link (STA/AP) through the Per-STA Profile. The Present field may be present for the Common Info and the Link Info, respectively. The Common Info may be present in the Multi-link Control field, and the link Info may be present in the Per-STA Control field included in the Per-STA Profile. As mentioned above, these Present Fields can determine whether or not to include information according to the type (Type Subfield of the Multi-link Control field) of the multi-link element, purpose, and procedure. In this way, it is possible to avoid the inclusion of unnecessary information and to have a compact ML IE format suitable for each purpose. An example of this may be as follows.

Present Field #1: TID-to-Link Mapping

For example, if the bit in front of the TID-to-link mapping field (i.e., TID-to-link mapping present field) indicates '1', this field is present, and if '0' indicates this field it not present.

If the TID-to-link Mapping is located in the Common Info, the presence or absence may be indicated through the TID-to-link Mapping Present subfield of the Multi-link Control field. If the value of the Present subfield is '1', the TID-to-link Mapping field is present in the Common Info field. Basically, TID-to-link mapping is a default operation and separate signaling is not necessary, and since all TIDs are defined as mapped to all links, the present field may be useful if separate signaling is required.

Similarly, presence or absence may be indicated through the TID-to-link Mapping Present subfield of the Per-STA Control field. If the value of this subfield is '1', the TID-to-link Mapping field is present in the Per-STA Profile.

If TID-to-link mapping for all setup links is indicated through the Present field in Common Info and implicitly indicated in the order of Link IDs, the overhead of sub-element ID, Link ID, Complete Profile, etc. included by default in the Link Info may be reduced. (e.g., FIG. 30). However, in the Per-STA Profile (e.g., FIG. 31), only a part of a specific link may be indicated through the Link ID, and in this case, the number of links to be indicated may be required in the Common Info. In addition, if the TID-to-link mapping is always carried together with other information, the Link Info that can indicate information for each link through link ID may be positionally appropriate.

Present Field #2: STR Capability

For example, if '1' is indicated in front of the STR Capability, this field is present, and if '0' is indicated, this field is not present.

If the STR Capability is located in the Common Info, the presence or absence may be indicated through the STR Capability Present subfield of the Multi-link Control field. If the value of the Present subfield is '1', the STR Capability field may be present in the Common Info field. If the MLD (e.g., the AP MLD) operates based on STR by default for all link pairs, separate signaling may not be required. Therefore, if there is a link pair that does not operate based on STR, this present field may be useful.

An example of the Present field is shown when the STR Capability is indicated in the Link Info instead of the Common Info. Similarly, presence or absence may be indicated through the STR Capability Present subfield of the Per-STA Control field. If the value of this subfield is '1', the STR Capability field is present in the Per-STA Profile. In this STR capability, only pairs with other links are indicated based on the link corresponding to the Per-STA. For example, if the link 2 is the standard of the Per-STA, it indicates the STR Capability for a pair of the link 2 and the link 1 and a pair of the link 2 and the link 3.

If the STR capability for all links is indicated through the Present field in Common Info, and the pairs are implicitly indicated (indicated as in Example 2) in the order of Link ID, sub-element ID, Link ID, Complete Profile included by default in Link Info overhead may be reduced. In addition, in the Link Info, redundancy may occur when viewed as a whole. (e.g., {Link #1, Link #2} and {Link #2, Link #1}. However, if this capability is indicated only when there is a (NSTR) link pair that does not operate based on STR, it may be difficult to distinguish pairs in the common info. Therefore, the method of indicating through the present field in the link info may be appropriate.

Present Field #3: Information Related to Association Link (i.e., Transmitting STA)

This may indicate the presence or absence of information related to the association link described above, that is the link (STA) that transmits the ML element.

Since the information related to the STA transmitting the ML element is included in the Management (Mgmt) frame (e.g., Beacon, Probe Response frame) including the multi-link element, most of the information may not be separately included in the ML element. However, it may be included in the ML element if it is not always included in the Mgmt frame (e.g., Change Sequence, link ID) or the STA requests partial information instead of complete information. If this information is included in the Per-STA Profile of the Link Info, a separate Present field is not required because the link ID is indicated and can already be identified. However, in order to reduce the default overhead of the Link Info mentioned above, the Present field may be included when included in the Common Info. In addition, if the above information is present due to the Present field having a value of '1', the information related to the transmitting STA may have one format.

The presence or absence may be indicated through the Transmitting STA's Info Present subfield of the Multi-link Control field. If the value of the Present subfield is '1', the Transmitting STA's Info field is present in the Common Info field. The Link ID, Change Sequence, etc. may be indicated in the Transmitting STA's Info, and may include additionally requested information, but this is not limited thereto.

Present Field #4: An Example of Indicating Information Related to Number of Links This information refers to the above-mentioned 1) Number of Supported links.

The number of supported link indicates the number of APs that can simultaneously exchange data frames (and/or management frame) for the AP MLD, and the number of non-AP STAs that can simultaneously exchange data frames (and/or management frames) for the non-AP MLD.

This information may be present depending on the Mgmt frame and its purpose, that is, it may be present when signaling affected by this information is present in the ML element. Further, this information may not be present when signaling affected by this information is not present. Therefore, the Present field may be present.

The Presence may be indicated through the Number of links Present subfield of the Multi-link Control field. If the value of this subfield is '1', the Number of links field is present in the Common Info.

If information related to all STAs (links) in the MLD is always included, the Number of links can be inferred from the number of Per-STA Profiles. However, the Present field may be required because there may be cases where it is not (e.g., when information on only some links is requested, or when information on all STAs is not always included in the case of association). In addition, the Number of links Present field may be required because whether or not to include a field affected by Number of links can be determined according to the type of the management frame including the ML element and the purpose of the ML element. For example, in non-AP MLD, when information related to a link to be received from an AP is not yet known, such as when transmitting a Probe Request frame during initial scanning, as mentioned above, because signaling for the STR capability or TID-to-link mapping affected by Number of links may not be performed, the Number of links field may not be required. However, if the MLD knows the link information like when transmitting an Association Request frame, and signaling for the STR capability or TID-to-link mapping is required, the Number of links is necessary. Therefore, the Number of links can be dynamically indicated through the Present field.

The signaling affected by the number of links field and the effect of this information are as follows.

TID-to Link Mapping and STR Capability

As mentioned in the above #1 and #2 of the Present field, the field size of the TID-to-link mapping and STR capability may vary depending on the Number of links. That is, if a TID bitmap is used in the TID-to-link mapping, the number of TID bitmaps varies according to the number of links, and if the STR is indicated according to pairs in the STR capability, the number of pairs varies according to the number of links. Therefore, the number of links can affect the size of these fields.

The transmitting MLD may transmit a multi-link element (S4820).

The transmitting MLD may transmit an RNR element (S4830). For example, the RNR element may include a target beacon transmission time (TBTT) information field, and the TBTT information field may include information related to a link through which the RNR element is transmitted.

Information of the multi-link element may be indicated by partially modifying the reduced neighbor report element. A TBTT Information field is present in the Reduced Neighbor report element, and the TBTT Information field can have a field size of up to 255 octets through the indication of the TBTT Information length field. However, the reduced neighbor report element can be configured to be variable with sub-element, but if the length is specified in the TBTT information Length field and ML information is indicated using the TBTT Information field, since the length is determined, there can be a problem in that it is difficult to indicate variable values according to the number of links. To improve this, there may be a method of specifying it in the form of range or specifying the maximum length value and indicating within it.

1) For Legacy or for Multi-Link

First, in order to determine whether information related to each neighbor AP is for legacy or ML, a reserved bit of the TBTT Information Header or a TBTT Information field may be used.

2) EHT Capability/Operation Element or Reduced EHT Capability/Operation Element (e.g., the Above-Mentioned Multi-Link Element)

The above-mentioned (reduced) capability/operation element can also indicate a length that matches the field size if the size is determined, but it is difficult to set the correct length since the relationship between links such as STR capability is variable. However, such a variable field is indicated separately, and it is possible if the TBTT information field is used for the fixed field.

The TBTT Information field may include multi-link information. A reserved bit may be present among 20 octets, the operation link value is set to '1' and the primary link value is set to '1', and the neighbor AP information including this field is link information for ML, and is a link selected for ML operation and an example selected as the primary link.

The MLD ID may correspond to the above-mentioned 1) For Legacy or For Multi-link, and the Link ID and Change Sequence may correspond to the link specific information. That is, through this field, it can be known whether it belongs to an MLD, and which MLD it belongs to.

Figure 49:
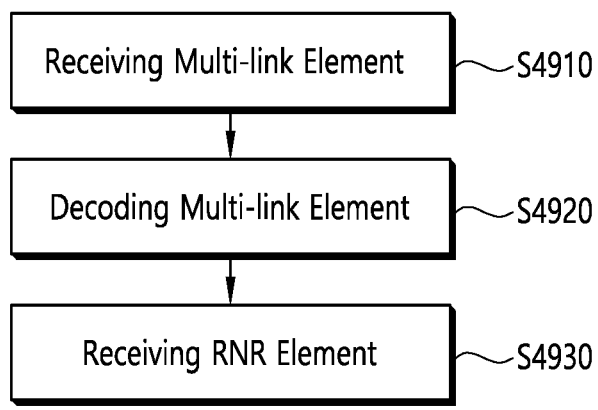
FIG. 49 is a flowchart illustrating an embodiment of a receiving MLD operation method.

FIG. 49 is a flowchart illustrating an embodiment of a receiving MLD operation method.

Referring to FIG. 49, the receiving MLD may receive a multi-link element (S4910). For example, the multi-link element may include a multi-link control field, a common info/information field, and a link info/information field. And, the multi-link control field may include a first present field related to presence of a number of links field, and the common information field may include the number of links field based on the first present field.

For example, the link information field includes a per-STA control field for each station (STA), the per-STA control field includes a second present field related to presence/absence of a TID-to-link mapping field, the link information field may further include the TID-to-link mapping field based on the second present field. The TID link mapping field may include information related to a TID assigned to each link.

For example, the link information field may include a per-STA control field, the per-STA control field may include a third present field related to presence/absence of a Simultaneous Transmit and Receive (STR) capability field, the link information field may further include the STR capability field based on the third present field, and the STR capability field may include information related to whether each link supports STR.

For example, the number of links field may include information related to a number of links through which the transmitting MLD is able to simultaneously perform physical protocol data unit (PPDU) exchange.

For example, the multi-link element may be transmitted through an association link, the multi-link control field may further include a fourth present field related to presence/absence of an association link information field, the common information field may further include the association link information field based on the fourth present field, and the association link information field may include a link identifier (ID) subfield and a change sequence subfield.

For example, wherein the size of the TID-to-link mapping field may be determined based on the number of links field.

Number of supported links: This indicates the total number of supported links.

Ex) When using a Bitmap and the total number of links is set to '3', the above content can be set to '11' if association link is included and '10' if not included.

The number of supported links may mean the number of APs that can simultaneously exchange data frames (and/or management frames) by the AP MLD, and the number of non-AP STAs that can simultaneously exchange data frames by the non-AP MLD. The technical effect obtained by indicating this value in the multi-link (ML) element will be separately described in the Present field below.

The multi-link element may include a number of links field, a Link Specific information field, and an Indication regarding ML operation field. The Link Specific information field may include ID, Channel Information, Assisted information, and Capability fields.

The multi-link element may be applied to the following examples.

Example 1: An Example for Indicating a Link Set

The multi-link element can be used when requesting/responding an operation link and determining the primary link described above.

It can be indicated in the form of a bitmap by using the order of the indicated links.

The multi-link element includes information related to the link 2 and the link 3 in order, a STA A requests the link 1 and the link 2 as an operating link, and an AP 1 responds to the request. In this case, the link set can be indicated by using a bitmap in the order of the link 1 (transmitting the element), the link 2, and the link 3. Therefore, the STA A may request the AP by indicating the bitmap of '110', and the AP may confirm the bitmap of '110'.

Example 2: An Example of Indicating STR Capability

The Multi-link Element includes information on the link 2 and the; ink 3 in order, and may indicate STR capability for link(s) 1/2/3.

In the first example, the multi-link element includes information that the link 1 and the link 2 operate based on STR, and the link 2 and the link 3 operate based on STR(1), so the information that the link 1 and the link 3 can also operate based on STR can be included.

The second example is an example in which the multi-link element indicates for all pairs, and assuming that the pair order is set to {link 1 and link 2}, {link 1 and link 3}, and {link 2 and link 3}, information that all pairs are operated based on STR (1) can be included.

Example 3: An Example of Indicating TID-to-Link Mapping

The multi-link element includes information related to the link 2 and the link 3 in order, and shows TID-to-link mapping using a bitmap starting/considered from the link 1, which is an association link.

The figure on the left is an example of a bitmap for a link to which each TID is assigned. For example, if '110' is indicated for the TID 0, it means that the TID 0 is allocated to the link 1 and the link 2. The figure on the right is an example of the bitmap for the TID assigned to each link, and the link order is the same as indicated in the link-specific information. For example, if '001111111' is indicated for the link 1, it means that TIDs 2 to 7 are allocated to the link 1. While the method on the left and the right figure are different, the signaling overhead is the same.

The multi-link element includes information related to the link 2 and the link 3 in order, and shows TID-to-link mapping using a bitmap starting/considered from the link 1, which is an association link.

To reduce signaling overhead, two TIDs are bundled/grouped for each AC, and when '111' is indicated for TID 1/2 (i.e., AC_BK), it means that all links are allocated for the TID 1 and the TID 2.

An Example of Allowing Dynamic Indication

The fields mentioned above may pre-define fields that can be omitted for each AP MLD or non-AP MLD or frame. Alternatively, without defining this, it is possible to dynamically determine whether the field is present by using 1 bit in front of the above-mentioned field. In the present disclosure, this field may be referred to as a Present field.

The multi-link element is basically composed of Common Info and Link Info. The Common Info includes common information among STAs in the MLD, and the Link Info includes specific information for each link (STA/AP) through the Per-STA Profile. The Present field may be present for the Common Info and the Link Info, respectively. The Common Info may be present in the Multi-link Control field, and the link Info may be present in the Per-STA Control field included in the Per-STA Profile. As mentioned above, these Present Fields can determine whether or not to include information according to the type (Type Subfield of the Multi-link Control field) of the multi-link element, purpose, and procedure. In this way, it is possible to avoid the inclusion of unnecessary information and to have a compact ML IE format suitable for each purpose. An example of this may be as follows.

Present Field #1: TID-to-Link Mapping

For example, if the bit in front of the TID-to-link mapping field (i.e., TID-to-link mapping present field) indicates '1', this field is present, and if '0' indicates this field it not present.

If the TID-to-link Mapping is located in the Common Info, the presence or absence may be indicated through the TID-to-link Mapping Present subfield of the Multi-link Control field. If the value of the Present subfield is '1', the TID-to-link Mapping field is present in the Common Info field. Basically, TID-to-link mapping is a default operation and separate signaling is not necessary, and since all TIDs are defined as mapped to all links, the present field may be useful if separate signaling is required.

Similarly, presence or absence may be indicated through the TID-to-link Mapping Present subfield of the Per-STA Control field. If the value of this subfield is '1', the TID-to-link Mapping field is present in the Per-STA Profile.

If TID-to-link mapping for all setup links is indicated through the Present field in Common Info and implicitly indicated in the order of Link IDs, the overhead of sub-element ID, Link ID, Complete Profile, etc. included by default in the Link Info may be reduced. (e.g., FIG. 30). However, in the Per-STA Profile (e.g., FIG. 31), only a part of a specific link may be indicated through the Link ID, and in this case, the number of links to be indicated may be required in the Common Info. In addition, if the TID-to-link mapping is always carried together with other information, the Link Info that can indicate information for each link through link ID may be positionally appropriate.

Present Field #2: STR Capability

For example, if '1' is indicated in front of the STR Capability, this field is present, and if '0' is indicated, this field is not present.

If the STR Capability is located in the Common Info, the presence or absence may be indicated through the STR Capability Present subfield of the Multi-link Control field. If the value of the Present subfield is '1', the STR Capability field may be present in the Common Info field. If the MLD (e.g., the AP MLD) operates based on STR by default for all link pairs, separate signaling may not be required. Therefore, if there is a link pair that does not operate based on STR, this present field may be useful.

An example of the Present field is shown when the STR Capability is indicated in the Link Info instead of the Common Info. Similarly, presence or absence may be indicated through the STR Capability Present subfield of the Per-STA Control field. If the value of this subfield is '1', the STR Capability field is present in the Per-STA Profile. In this STR capability, only pairs with other links are indicated based on the link corresponding to the Per-STA. For example, if the link 2 is the standard of the Per-STA, it indicates the STR Capability for a pair of the link 2 and the link 1 and a pair of the link 2 and the link 3.

If the STR capability for all links is indicated through the Present field in Common Info, and the pairs are implicitly indicated (indicated as in Example 2) in the order of Link ID, sub-element ID, Link ID, Complete Profile included by default in Link Info overhead may be reduced. In addition, in the Link Info, redundancy may occur when viewed as a whole. (e.g., {Link #1, Link #2} and {Link #2, Link #1}. However, if this capability is indicated only when there is a (NSTR) link pair that does not operate based on STR, it may be difficult to distinguish pairs in the common info. Therefore, the method of indicating through the present field in the link info may be appropriate.

Present Field #3: Information Related to Association Link (i.e., Transmitting STA)

This may indicate the presence or absence of information related to the association link described above, that is the link (STA) that transmits the ML element.

Since the information related to the STA transmitting the ML element is included in the Management (Mgmt) frame (e.g., Beacon, Probe Response frame) including the multi-link element, most of the information may not be separately included in the ML element. However, it may be included in the ML element if it is not always included in the Mgmt frame (e.g., Change Sequence, link ID) or the STA requests partial information instead of complete information. If this information is included in the Per-STA Profile of the Link Info, a separate Present field is not required because the link ID is indicated and can already be identified. However, in order to reduce the default overhead of the Link Info mentioned above, the Present field may be included when included in the Common Info. In addition, if the above information is present due to the Present field having a value of '1', the information related to the transmitting STA may have one format.

The presence or absence may be indicated through the Transmitting STA's Info Present subfield of the Multi-link Control field. If the value of the Present subfield is '1', the Transmitting STA's Info field is present in the Common Info field. The Link ID, Change Sequence, etc. may be indicated in the Transmitting STA's Info, and may include additionally requested information, but this is not limited thereto.
Present Field #4: An Example of Indicating Information Related to Number of Links This information refers to the above-mentioned 1) Number of Supported links.

The number of supported link indicates the number of APs that can simultaneously exchange data frames (and/or management frame) for the AP MLD, and the number of non-AP STAs that can simultaneously exchange data frames (and/or management frames) for the non-AP MLD.

This information may be present depending on the Mgmt frame and its purpose, that is, it may be present when signaling affected by this information is present in the ML element. Further, this information may not be present when signaling affected by this information is not present. Therefore, the Present field may be present.

The Presence may be indicated through the Number of links Present subfield of the Multi-link Control field. If the value of this subfield is '1', the Number of links field is present in the Common Info.

If information related to all STAs (links) in the MLD is always included, the Number of links can be inferred from the number of Per-STA Profiles. However, the Present field may be required because there may be cases where it is not (e.g., when information on only some links is requested, or when information on all STAs is not always included in the case of association). In addition, the Number of links Present field may be required because whether or not to include a field affected by Number of links can be determined according to the type of the management frame including the ML element and the purpose of the ML element. For example, in non-AP MLD, when information related to a link to be received from an AP is not yet known, such as when transmitting a Probe Request frame during initial scanning, as mentioned above, because signaling for the STR capability or TID-to-link mapping affected by Number of links may not be performed, the Number of links field may not be required. However, if the MLD knows the link information like when transmitting an Association Request frame, and signaling for the STR capability or TID-to-link mapping is required, the Number of links is necessary. Therefore, the Number of links can be dynamically indicated through the Present field.

The signaling affected by the number of links field and the effect of this information are as follows.
TID-to Link Mapping and STR Capability As mentioned in the above #1 and #2 of the Present field, the field size of the TID-to-link mapping and STR capability may vary depending on the Number of links. That is, if a TID bitmap is used in the TID-to-link mapping, the number of TID bitmaps varies according to the number of links, and if the STR is indicated according to pairs in the STR capability, the number of pairs varies according to the number of links. Therefore, the number of links can affect the size of these fields.

The receiving MLD may decode the multi-link element (S4920).

The receiving MLD may receive the RNR element (S4930). For example, the RNR element may include a target beacon transmission time (TBTT) information field, and the TBTT information field may include information related to a link through which the RNR element is transmitted.

Information of the multi-link element may be indicated by partially modifying the reduced neighbor report element. A TBTT Information field is present in the Reduced Neighbor report element, and the TBTT Information field can have a field size of up to 255 octets through the indication of the TBTT Information length field. However, the reduced neighbor report element can be configured to be variable with sub-element, but if the length is specified in the TBTT information Length field and ML information is indicated using the TBTT Information field, since the length is determined, there can be a problem in that it is difficult to indicate variable values according to the number of links. To improve this, there may be a method of specifying it in the form of range or specifying the maximum length value and indicating within it.
1) For Legacy or for Multi-Link First, in order to determine whether information related to each neighbor AP is for legacy or ML, a reserved bit of the TBTT Information Header or a TBTT Information field may be used.
2) EHT Capability/Operation Element or Reduced EHT Capability/Operation Element (e.g., the Above-Mentioned Multi-Link Element)

The above-mentioned (reduced) capability/operation element can also indicate a length that matches the field size if the size is determined, but it is difficult to set the correct length since the relationship between links such as STR capability is variable. However, such a variable field is indicated separately, and it is possible if the TBTT information field is used for the fixed field.

The TBTT Information field may include multi-link information. A reserved bit may be present among 20 octets, the operation link value is set to '1' and the primary link value is set to '1', and the neighbor AP information including this field is link information for ML, and is a link selected for ML operation and an example selected as the primary link.

The MLD ID may correspond to the above-mentioned 1) For Legacy or For Multi-link, and the Link ID and Change Sequence may correspond to the link specific information. That is, through this field, it can be known whether it belongs to an MLD, and which MLD it belongs to Some of the detailed steps shown in the examples of FIG. 48 and FIG. 49 may not be essential steps and may be omitted. In addition to the steps shown in FIGS. 48 and 49, other steps may be added, and the order of the steps may vary. Only a part of the above steps may have its independent technical meaning.

The technical features of the present specification described above may be applied to various devices and methods. For example, the above-described technical features of the present specification may be performed/supported through the apparatus of FIG. 1 and/or FIG. 19. For example, the above-described technical features of the present specification may be applied only to a part of FIG. 1 and/or FIG. 19. For example, the technical features of the present specification described above are implemented based on the processing chip(s) 114 and/or 124 of FIG. 1, or implemented based on the processor(s) 111 and/or 121 and the memory(s) 112 and/or 122 of FIG. 1, or may be implemented based on the processor 610 and the memory 620 of FIG. 19. For example, a receiving multi-link device (MLD) in a wireless local area network (WLAN) system may comprise: wherein the receiving MLD includes a first station (STA) and a second STA, wherein the first STA operates on a first link, and the second STA operates on a second link; wherein the receiving MLD further comprises: a memory; and a processor operatively coupled to the memory, wherein the process is configured to: receive, via the first STA, multi-link information including information related to the first link and the second link from a transmitting MLD; and transmit, via the first STA, multi-link address information to the transmitting MLD, wherein the multi-link address information includes a media access control (MAC) address of the second STA.

The technical features of the present specification may be implemented based on a computer readable medium (CRM). For example, the CRM proposed by the present specification may store instructions that, based on being executed by at least one processor of a receiving multi-link device (MLD) in a Wireless Local Area Network system, perform operations comprising: wherein the receiving MLD device includes a first station (STA) and a second STA, the first STA operates on a first link, and the second STA operates on a second link; receiving, by the first STA, multi-link information including information related to the first link and the second link from a transmitting MLD; and transmitting, by the first STA, multi-link address information to the transmitting MLD, wherein the multi-link address information includes a media access control (MAC) address of the second STA.

The instructions stored in the CRM of the present specification may be executed by at least one processor. At least one processor related to CRM in the present specification may be the processor(s) 111 and/or 121 or the processing chip(s) 114 and/or 124 of FIG. 1, or the processor 610 of FIG. 19. Meanwhile, the CRM of the present specification may be the memory(s) 112 and/or 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method.

In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
generating, by a station (STA) affiliated with a multi-link device (MLD), an Association Request frame including a multi-link element,
wherein the multi-link element includes a multi-link control field, and a common information field which is contiguous to the multi-link control field,
wherein the multi-link control field includes a first present field related to presence/absence of a link information field, and the first present field has a length of 1 bit,
wherein the link information field has a length of 4 bits and is related to a number of stations affiliated with the MLD that support simultaneous transmission or reception of frames on respective links,
wherein the common information field includes the link information field based on the first present field,
wherein the common information field further includes a Medium Access Control (MAC) address field related to the MLD;
transmitting, by the STA, the Association Request frame; and
receiving, by the STA, an Association Response frame.

2. The method of claim 1, wherein the link information field indicates a maximum number of stations affiliated with the MLD that support simultaneous transmission or reception on respective links.

3. The method of claim 1, further comprising:
transmitting a reduced neighbor report (RNR) element, wherein the RNR element includes a target beacon transmission time (TBTT) information field, and the TBTT information field includes an MLD ID subfield identifying the MLD and a Link identifier (ID) subfield identifying a link of the MLD.

4. The method of claim 1, wherein the MLD operates in a plurality of links, wherein each of the plurality of links is configured based on at least one of 2.4 GHz band, 5 GHz band, and/or 6 GHz band.

5. A method in a wireless local area network (WLAN) system, the method comprising:
generating a multi-link element,
wherein the multi-link element includes a multi-link control field, a common information field, and a link information field,
wherein the multi-link control field has a length of two octets,
wherein the multi-link control field includes a first present field having a length of 1 bit,
wherein the first present field is related to presence of a sub-field in the common information field,
wherein the sub-field is related to a number of links,
transmitting the multi-link element; and
transmitting a reduced neighbor report (RNR) element, wherein the RNR element includes a target beacon transmission time (TBTT) information field, and the TBTT information field includes an Access Point Multi-link Device (AP MLD) ID subfield identifying an AP MLD and a Link ID subfield identifying a link of an AP within the AP MLD.

6. The method of claim 5,
wherein the link information field includes a per-STA control field,
wherein the per-STA control field includes a second present field related to presence of a traffic identifier to link (TID-to-link) mapping field,
wherein the link information field further includes the TID-to-link mapping field based on the second present field,
wherein the TID-to-link mapping field includes information related to a TID assigned to each link.

7. The method of claim 5, wherein the sub-field includes information related to a number of links through which the AP MLD is able to simultaneously perform physical protocol data unit (PPDU) exchange.

8. The method of claim 5, wherein the sub-field being related to the number of links has a length of 4 bits.

9. The method of claim 5, wherein the first present field is set to one when the sub-field being related to the number of links is present in the common information field.

10. A method in a wireless local area network (WLAN) system, the method comprising:
receiving a multi-link element,
wherein the multi-link element includes a multi-link control field, a common information field, and a link information field,
wherein the multi-link control field has a length of two octets,
wherein the multi-link control field includes a first present field having a length of 1 bit,
wherein the first present field is related to presence of a sub-field in the common information field,
wherein the sub-field is related to a number of links; and
receiving a reduced neighbor report (RNR) element,
wherein the RNR element includes a target beacon transmission time (TBTT) information field, and the TBTT information field includes an Access Point Multi-link Device (AP MLD) ID subfield identifying an AP MLD and a Link ID subfield identifying a link of an AP within the AP MLD.

11. The method of claim 10,
wherein the link information field includes a per-STA control field,
wherein the per-STA control field includes a second present field related to presence of a traffic identifier to link (TID-to-link) mapping field,
wherein the link information field further includes the TID-to-link mapping field based on the second present field,
wherein the TID-to-link mapping field includes information related to a TID assigned to each link.

12. The method of claim 10, wherein the sub-field includes information related to a number of links through which the AP MLD is able to simultaneously perform physical protocol data unit (PPDU) exchange.

13. The method of claim 10, wherein the sub-field being related to the number of links has a length of 4 bits.

14. The method of claim 10, wherein the first present field is set to one when the sub-field being related to the number of links is present in the common information field.

* * * * *